US010311930B1

United States Patent
Kim et al.

(10) Patent No.: US 10,311,930 B1
(45) Date of Patent: Jun. 4, 2019

(54) ONE-TIME PROGRAMMING (OTP) MAGNETO-RESISTIVE RANDOM ACCESS MEMORY (MRAM) BIT CELLS IN A PHYSICALLY UNCLONABLE FUNCTION (PUF) MEMORY IN BREAKDOWN TO A MEMORY STATE FROM A PREVIOUS READ OPERATION TO PROVIDE PUF OPERATIONS

(71) Applicant: QUALCOMM Incorporated, San Diego, CA (US)

(72) Inventors: Sungryul Kim, San Diego, CA (US); Chando Park, Palo Alto, CA (US); Seung Hyuk Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/946,209

(22) Filed: Apr. 5, 2018

(51) Int. Cl.
G06F 7/58 (2006.01)
G11C 11/16 (2006.01)
G11C 17/02 (2006.01)
H04L 9/32 (2006.01)

(52) U.S. Cl.
CPC ........ G11C 11/1673 (2013.01); G11C 11/161 (2013.01); G11C 11/1655 (2013.01); G11C 11/1657 (2013.01); G11C 11/1659 (2013.01); G11C 11/1675 (2013.01); G11C 17/02 (2013.01); H04L 9/3278 (2013.01)

(58) Field of Classification Search
CPC ............ G11C 11/1673; G11C 11/1655; G11C 11/1657; G11C 11/1659; G11C 11/1675; G11C 17/02; H04L 9/3278

USPC .......................................................... 365/97
See application file for complete search history.

(56) References Cited

U.S. PATENT DOCUMENTS 9,298,946 B2   3/2016   Zhu et al.
9,343,135 B2   5/2016   Zhu et al.
9,489,999 B2   11/2016  Rosenberg et al.
9,712,330 B2   7/2017   Smith
(Continued)

OTHER PUBLICATIONS

Zhang, Le et al., "Highly Reliable Memory-based Physical Unclonable Function Using Spin-Transfer Torque MRAM," 2014 IEEE International Symposium on Circuits and Systems (ISCAS), 2014, IEEE, 4 pages (Year: 2014).*

Primary Examiner — Xiaochun L Chen
(74) Attorney, Agent, or Firm — W&T/Qualcomm

(57) ABSTRACT

One-time programming (OTP) magneto-resistive random access memory (MRAM) bit cells in a physically unclonable function (PUF) memory in breakdown to a memory state from a previous read operation to provide PUF operations is disclosed. PUF memory is configured to permanently one-time program an initial randomly generated PUF output from PUF MRAM bit cells accessed in an initial PUF read operation, to the same PUF MRAM bit cells accessed in the initial PUF read operation. In this manner, the initial PUF output is randomly generated due to process variations of the PUF MRAM bit cells to maintain an initial unpredictable memory state, but the PUF output will be reproduced for subsequent PUF read operations to the same PUF MRAM bit cells in the PUF memory array for reproducibility. The OTP of the PUF MRAM bit cells can be accomplished by applying breakdown voltage to the PUF MRAM bit cells during programming.

30 Claims, 9 Drawing Sheets

(56) References Cited

U.S. PATENT DOCUMENTS

| | | | | |
|---|---|---|---|---|
| 9,948,471 B2* | 4/2018 | Katoh | .................. | H04L 9/3278 |
| 2013/0073598 A1* | 3/2013 | Jacobson | ................ | G06F 7/588 |
| | | | | 708/252 |
| 2016/0373264 A1* | 12/2016 | Katoh | .................. | H04L 9/3278 |
| 2017/0272258 A1* | 9/2017 | Tanamoto | ........... | G11C 11/1673 |

* cited by examiner

US 10,311,930 B1

ONE-TIME PROGRAMMING (OTP) MAGNETO-RESISTIVE RANDOM ACCESS MEMORY (MRAM) BIT CELLS IN A PHYSICALLY UNCLONABLE FUNCTION (PUF) MEMORY IN BREAKDOWN TO A MEMORY STATE FROM A PREVIOUS READ OPERATION TO PROVIDE PUF OPERATIONS

BACKGROUND

I. Field of the Disclosure

The technology of the disclosure relates generally to physically unclonable functions (PUFs), and more particularly to PUF cells employing a magnetic tunnel junction (MTJ) for generating a random output as a function of MTJ resistance.

II. Background

A physical unclonable function (PUF) (also called a physically unclonable function (PUF)) is a physical entity that is embodied in a physical structure, and is easy to evaluate but hard to predict. PUFs depend on the uniqueness of their physical microstructure. This microstructure depends on random physical factors introduced during manufacturing. For example, in the context of integrated circuits (ICs), an on-chip PUF is a chip-unique challenge-response mechanism exploiting manufacturing process variations inside the ICs. These manufacturing process variations are unpredictable and uncontrollable, which makes it virtually impossible to duplicate or clone the structure. When a stimulus is applied to a PUF cell, the PUF cell reacts and generates a response in an unpredictable but repeatable way due to the complex interaction of the stimulus with the physical microstructure of the IC employing the PUF cell. This exact microstructure of the IC depends on physical factors introduced during its manufacture, which are unpredictable. The applied stimulus is called the "challenge," and the reaction of the PUF cell is called the "response." A specific challenge and its corresponding response together form a challenge-response pair (CRP) or challenge-response behavior. The PUF's "unclonability" means that each IC employing the PUF cell has a unique and unpredictable way of mapping challenges to responses, even if one IC is manufactured with the same process as another seemingly identical IC. Thus, it is practically infeasible to construct a PUF cell with the same challenge-response behavior as another IC's PUF cell, because exact control over the manufacturing process is infeasible.

Because it is practically infeasible to construct a PUF cell with the same challenge-response behavior as another PUF cell, a PUF cell can be included in an IC to generate unique, random information based on the underlying physical characteristics of a device. For example, information generated by the PUF cell may be used to authenticate a device or may be used as a cryptographic key. As another example, a mobile device may include circuitry that is configured to generate a PUF output for use as a basis for a device identifier of the device. The device identifier may be used as part of an authentication process with a server that is programmed with the device identifier.

PUF cells can be implemented in several different technologies. As an example, a PUF cell can be provided in the form of a static random access memory (SRAM) cell. For example, FIG. 1 illustrates an SRAM PUF cell 100 in the form of an SRAM bit cell 102. As shown therein, the SRAM PUF cell 100 is comprised of two cross-coupled inverters 104(1), 104(2). Each inverter 104(1), 104(2) includes a pull-up P-type Field-Effect Transistor (FET) (PFET) 106P (1), 106P(2) coupled to a positive voltage rail 108P having a positive supply voltage $V_{DD}$, and a pull-down N-type FET (NFET) 106N(1), 106N(2) coupled to a negative voltage rail 108N having a negative supply voltage $V_{SS}$. The cross-coupled inverters 104(1), 104(2) reinforce each other to retain data in the form of a voltage on a respective true storage node T and a complement storage node C. In a read operation, a bit line BL and a complement bit line BLB are pre-charged to the positive supply voltage $V_{DD}$. Then, a word line WL coupled to gates G of the access transistors 110(1), 110(2) is asserted to evaluate the differential voltages on the true storage node T and complement storage node C to read the SRAM bit cell 102. If the SRAM bit cell 102 has not been previously written, the initial state of the SRAM bit cell 102 is determined by process variation of the pull-up PFETs 106P(1), 106P(2) and the pull-down NFETs 106N(1), 106N(2) when the word line WL is asserted to activate the access transistors 110(1), 110(2) (their gate-to-source voltage exceeding their threshold voltage $V_{TH}$). Thus, the SRAM bit cell 102 can be used to generate a random PUF output. Either the true storage node T or complement storage node C can be used as the random PUF output. The voltage state ($V_{DD}$ or $V_{SS}$) on the true storage node T will eventually settle to be the opposite voltage state on the complement storage node C ($V_{SS}$ or $V_{DD}$).

Ideally, the inverters 104(1), 104(2) will be symmetrically matched so that the SRAM bit cell 102 is not skewed to favor settling to one voltage state over the other. For example, length L and threshold voltages $V_{TH}$ of complementary pull-up PFETs 106P(1), 106P(2) and complementary pull-down NFETs 106N(1), 106N(2) can be sized to generate a same voltage noise $V_{NOISE}$. As shown in FIG. 2A, ideally, the SRAM bit cell 102 in FIG. 1 has a neutral skew, wherein the inverters 104(1), 104(2) are symmetrically matched to generate a PUF output that is logic '0' for approximately half of the PUF read operations and logic '1' for approximately the other half of the PUF read operations. However, process variations can cause the complementary pull-up PFETs 106P(1), 106P(2) and complementary pull-down NFETs 106N(1), 106N(2) in the inverters 104(1), 104(2) in the SRAM bit cell 102 in FIG. 1 to be mismatched, and thus be skewed towards one voltage state. This is shown by example in FIG. 2B. As shown in FIG. 2B, random noise $\delta_{NOISE}$ resulting from process variation $\Delta_{PV}$ skews the voltage state (i.e., neutral-skewed) of the SRAM bit cell 102 to always generate a logic '1' PUF output.

Thus, the SRAM PUF cell 100 in FIG. 1 can be used to provide PUF memory cells by taking advantage of this imbalance in the inverters 104(1), 104(2) that will occur through process variation. A plurality of the SRAM PUF cells 100 can be used to generate random X-bit numbers at power-up through a read operation, such as chip identifications for example. The SRAM PUF cells 100 would be read and not written to first to obtain a random state at power-up. However, the reproducibility of the SRAM PUF cells 100 may be so inconsistent that a huge redundant array and sophisticated error correction scheme may be required to implement a PUF in SRAM. SRAM PUF cells 100 also can suffer from high error rates between cycles, temperature and supply power.

Another technique to provide a PUF cell is to use a spin-transfer torque (STT) magnetic tunnel junction (MTJ). In STT-MTJ devices, the spin polarization of carrier electrons, rather than a pulse of a magnetic field, is used to program the state stored in an MTJ device (i.e., a '0' or a '1'). FIG. 3 illustrates an MTJ 300 that can be provided as part of an MRAM bit cell 302 in an MRAM (not shown). An access transistor 304 is provided to control reading and writing to the MTJ 300. A drain D of the access transistor 304 is coupled to a bottom electrode 306 of the MTJ 300, which is coupled to a pinned layer 308 having a fixed or pinned magnetization direction. A word line WL is coupled to a gate G of the access transistor 304. A source S of the access transistor 304 is coupled to a voltage source $V_{SS}$ through a source line SL. The voltage source $V_{SS}$ provides a voltage $V_{SL}$ on the source line SL. A bit line BL is coupled to a top electrode 310 of the MTJ 300, which is coupled to a free layer 312 for example. The pinned layer 308 and the free layer 312 are separated by a tunnel barrier 314.

With continuing reference to FIG. 3, when writing data to the MRAM bit cell 302, the gate G of the access transistor 304 is activated by activating the word line WL. A write voltage differential between a voltage $V_{BL}$ on the bit line BL and the voltage $V_{SL}$ on the source line SL is applied to generate a write signal $I_W$ between the drain D and the source S of the access transistor 304 sufficient to change the magnetic orientation of the MTJ 300. If the magnetic orientation (i.e., direction) of the MTJ 300 is to be changed from anti-parallel (AP) to parallel (P), a write current $I_{AP-P}$ flowing from the free layer 312 to the pinned layer 308 is generated. This induces an STT at the free layer 312 to change the magnetic orientation of the free layer 312 to P with respect to the pinned layer 308. If the magnetic orientation is to be changed from P to AP, a current $I_{P-AP}$ flowing from the pinned layer 308 to the free layer 312 is produced, which induces an STT at the free layer 312 to change the magnetic orientation of the free layer 312 to AP with respect to the pinned layer 308. The resistance of the MTJ 300 is based on the magnetic orientation of the free layer 312. To read data from the MRAM bit cell 302, a read current $I_R$ that is less than a magnitude than the write current $I_W$ is injected into the MTJ 300 via the same current path used to write data. If the magnetic orientations of the MTJ's 300 free layer 312 and pinned layer 308 are oriented P to each other, the MTJ 300 presents a resistance that is different than the resistance the MTJ 300 would present if the magnetic orientations of the free layer 312 and the pinned layer 308 were in an AP magnetic orientation. The two different resistances represent a logic '0' and a logic '1' stored in the MTJ 300 that can be used as a PUF output.

The idea behind employing a STT-MRAM bit cell, such as the MRAM bit cell 302 in FIG. 3, in a PUF cell is based on exploiting the resistances of the MTJ 300 associated with the P and AP states of the MTJ 300. It has been observed that given a population of MTJs 300, when put in P and AP states, the MTJs 300 assume a possible range of values according to a Gaussian probability distribution function due to manufacturing process variations. The physical parameters of the devices' stacks lead to a dispersion of both P and AP resistances. Thus, use of an MRAM bit cell, such as the MRAM bit cell 302 in FIG. 3, in a PUF cell can exploit the process variations in the fabrication of the MTJ 300 and its resistance dispersion in such a way that this random physical phenomena can become a source of a robust, random output that may be used as a signature generation for such purposes, such as for chip identification as an example.

Because the PUF output from a PUF cell is often used for security-related applications and authorizations, it is desired to make a PUF memory to provide reproducible results, but to also not be susceptible to attack from the PUF cells being written with unauthorized data.

SUMMARY OF THE DISCLOSURE

Aspects disclosed herein include one-time programming (OTP) magneto-resistive random access memory (MRAM) bit cells in a physically unclonable function (PUF) memory in breakdown to a memory state from a previous read operation to provide PUF operations. In this regard, in aspects disclosed herein, a PUF MRAM is provided that includes an MRAM PUF array comprising a plurality of PUF MRAM bit cells organized in row and column format. For example, the PUF MRAM bit cells may each include a magnetic tunnel junction (MTJ) that can be programmed, such as by spin-transfer torque (STT), to change a magnetization state of a free layer to be in either a parallel (P) or anti-parallel (AP) state to designate the storage of a logic '0' or '1' memory state. An initial read operation to PUF MRAM bit cells in the MRAM PUF array will generate a random PUF output based on the process variation and other skew factors of the PUF MRAM bit cells. This PUF output may not be reproducible because of the random nature of the PUF output. However, it may be desirable for the PUF output from the same accessed PUF MRAM bit cells to be reproducible on subsequent PUF operations. In this regard, in aspects disclosed herein, the initial randomly generated PUF output from PUF MRAM bit cells accessed in an initial PUF read operation to the MRAM PUF array is subsequently used to OTP the same PUF MRAM bit cells into the same random read memory state permanently. In this manner, the initial PUF output is randomly generated due to the process variations of the PUF MRAM bit cells to maintain an initial unpredictable memory state, but the PUF output will be reproduced for subsequent PUF read operations to the same PUF MRAM bit cells in the MRAM PUF array for reproducibility. The OTP of the PUF MRAM bit cells to permanently program their memory state to their initial PUF output can be accomplished by applying a breakdown voltage to the PUF MRAM bit cells during their programming such that their respective MTJs are stressed and their respective tunnel barriers electrically breakdown and become short circuits. In this manner, the programmed state in the PUF MRAM bit cells is based on the process variations therein to maintain its initial unpredictable state, but such programming is made permanent.

In additional aspects disclosed herein, the MRAM PUF array can be integrated into an MRAM array that also contains an MRAM data memory for data operations. For example, certain MRAM bit cells in the MRAM array (e.g., one or more memory rows of MRAM bit cells) can be designated as PUF MRAM bit cells to form the MRAM PUF array in the MRAM array. For example, a programmer may configure certain MRAM bit cells in the MRAM array to be PUF MRAM bit cells for an MRAM PUF array. Thus, the MRAM PUF array can include one or more memory rows of both data MRAM bit cells and reference MRAM bit cells. The PUF MRAM bit cells in the MRAM PUF array can each be initially programmed to the same memory state (e.g., logic '0' or '1' memory state) in a configuration mode. Then, in response to a PUF read operation in the MRAM PUF array, the PUF MRAM bit cells and reference MRAM bit cells in the selected memory row in the MRAM PUF array activated by the PUF read operation are accessed. The resistance sensed from the PUF MRAM bit cells is compared to the reference resistance between the reference MRAM bit cells in the accessed memory row. The difference in sensed resistance between the PUF MRAM bit cells and the reference resistance of the PUF MRAM reference cells is used to generate a PUF output. This difference in resistances between the PUF MRAM bit cells and the reference MRAM bit cells will be unpredictable in nature since the PUF MRAM bit cells and the reference MRAM bit cells are all initially programmed to the same memory state. Thereafter, the PUF output can be used to OTP the PUF MRAM bit cells in the accessed memory row in the MRAM PUF array so that subsequent PUF read operations to the same PUF MRAM bit cells generate the same PUF output. Further, by integrating the MRAM PUF array into an MRAM array that also contains an MRAM data array, access circuitry, such as sense amplifiers, write drivers, and decoders, for example, can be shared to control access to the MRAM array for both memory read and PUF read operations, thus saving memory area as opposed to providing a PUF memory having its own dedicated access circuitry separate from a data memory.

In this regard, in one exemplary aspect, a memory access circuit for programming one or more PUF MRAM bit cells in an MRAM PUF array comprising at least one MRAM bit cell row circuit of PUF MRAM bit cells is provided. The memory access circuit comprises a data output circuit configured to, in response to a PUF read operation selecting an MRAM bit cell row circuit of PUF MRAM bit cells to be read, receive a PUF data signal representing a resistance of at least one PUF MRAM bit cell in the at least one MRAM bit cell column circuit for the selected MRAM bit cell row circuit for the PUF read operation. The data output circuit is configured to generate a PUF output indicating a memory state in the at least one PUF MRAM bit cell in the at least one MRAM bit cell column circuit for the selected MRAM bit cell row circuit, based on the PUF data signal. The memory access circuit also comprises a write driver circuit coupled to the PUF output. The write driver circuit is configured to, in response to the PUF read operation selecting the MRAM bit cell row circuit of the PUF MRAM bit cells to be read, generate a program write signal to program the at least one PUF MRAM bit cell in the at least one MRAM bit cell column circuit to a permanent memory state based on the memory state indicated by the PUF output.

In another exemplary aspect, a memory access circuit for programming one or more PUF MRAM bit cells in an MRAM PUF array comprising at least one MRAM bit cell row circuit of PUF MRAM bit cells is provided. The memory access circuit comprises a means for generating a program write signal to program at least one PUF MRAM bit cell in at least one MRAM bit cell column circuit to a reference memory state, in response to a PUF write operation selecting an MRAM bit cell row circuit to be written in the MRAM PUF array. In response to a PUF read operation selecting the MRAM bit cell row circuit of the PUF MRAM bit cells to be read, the memory access circuit comprises a means for receiving a PUF data signal representing a resistance of the at least one PUF MRAM bit cell in the at least one MRAM bit cell column circuit for the selected MRAM bit cell row circuit for the PUF read operation, a means for generating a PUF output based on the PUF data signal, and a means for generating a program write signal to program the at least one PUF MRAM bit cell in the at least one MRAM bit cell column circuit to a permanent memory state based on a memory state indicated by the PUF output.

In another exemplary aspect, a method of programming at least one PUF MRAM bit cell in an MRAM PUF array in an MRAM for performing a PUF operation is provided. The MRAM PUF array comprises a plurality of MRAM bit cell row circuits each comprising a plurality of PUF MRAM bit cells, and a plurality of MRAM bit cell column circuits each comprising a PUF MRAM bit cell from an MRAM bit cell row circuit among the plurality of MRAM bit cell row circuits. The method comprises receiving a PUF data signal representing a resistance of at least one PUF MRAM bit cell in at least one MRAM bit cell column circuit for a selected MRAM bit cell row circuit for a PUF read operation, and generating a PUF output indicating a memory state in the at least one PUF MRAM bit cell in the at least one MRAM bit cell column circuit for the selected MRAM bit cell row circuit, based on the PUF data signal. The method further comprises generating a program write signal to program the at least one PUF MRAM bit cell in the at least one MRAM bit cell column circuit to a permanent memory state based on the memory state indicated by the PUF output.

DETAILED DESCRIPTION

Figure 1:
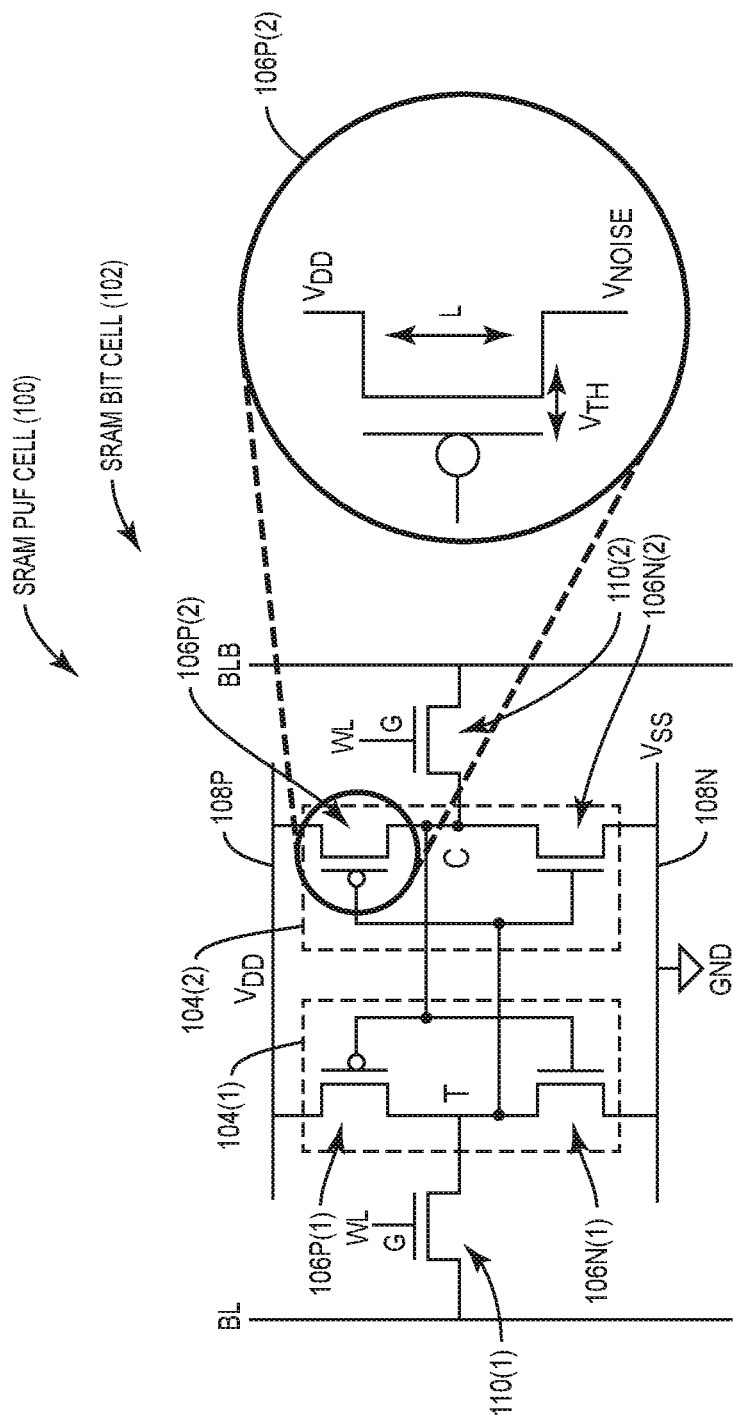
FIG. 1 is a schematic diagram of an exemplary static random access memory (SRAM) bit cell that can be used as a physically unclonable function (PUF) cell.
Figure 2B:
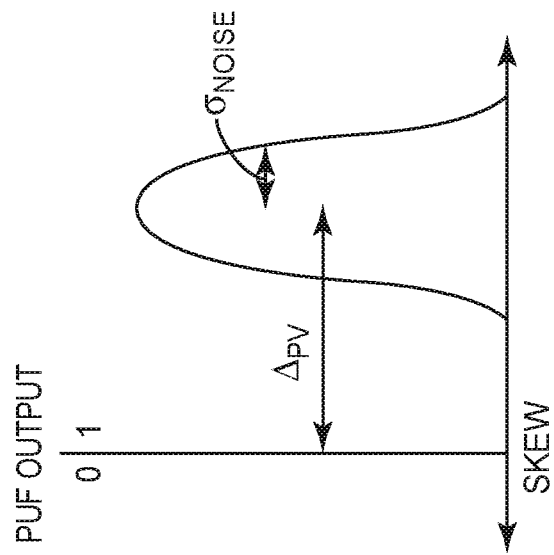
FIGS. 2A and 2B are graphs illustrating neutral-skew and 1-skew, respectively, in an SRAM bit cell.
Figure 2A:
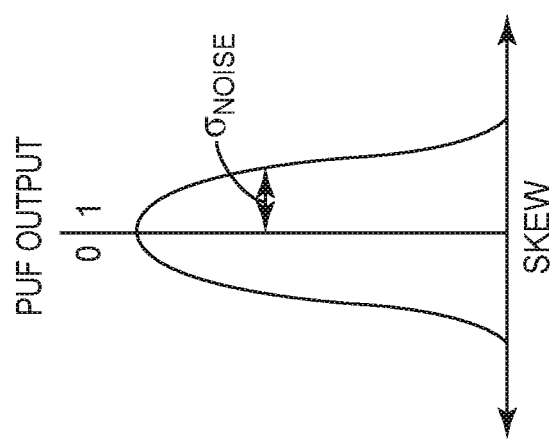
Figure 3:
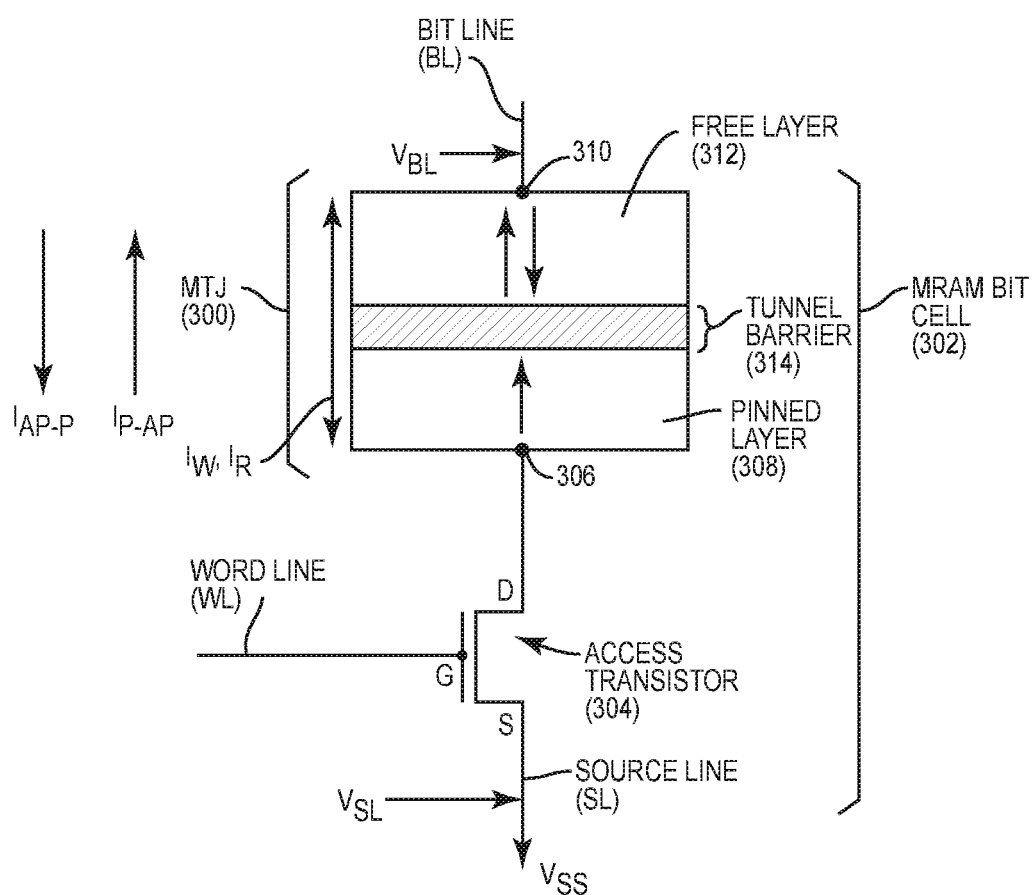
FIG. 3 is a schematic diagram of an exemplary spin-transfer torque (STT) magneto-resistive random access memory (MRAM) bit cell that can be used as a PUF cell.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include one-time programming (OTP) magneto-resistive random access memory (MRAM) bit cells in a physically unclonable function (PUF) memory in breakdown to a memory state from a previous read operation to provide PUF operations. In this regard, in aspects disclosed herein, a PUF MRAM is provided that includes an MRAM PUF array comprising a plurality of PUF MRAM bit cells organized in row and column format. For example, the PUF MRAM bit cells may each include a magnetic tunnel junction (MTJ) that can be programmed, such as by spin-transfer torque (STT), to change a magnetization state of a free layer to be in either a parallel (P) or anti-parallel (AP) state to designate the storage of a logic '0' or '1' memory state. An initial read operation to PUF MRAM bit cells in the MRAM PUF array will generate a random PUF output based on the process variation and other skew factors of the PUF MRAM bit cells. This PUF output may not be reproducible because of the random nature of the PUF output. However, it may be desirable for the PUF output from the same accessed PUF MRAM bit cells to be reproducible on subsequent PUF operations. In this regard, in aspects disclosed herein, the initial randomly generated PUF output from PUF MRAM bit cells accessed in an initial PUF read operation to the MRAM PUF array is subsequently used to OTP the same PUF MRAM bit cells into the same random read memory state permanently. In this manner, the initial PUF output is randomly generated due to the process variations of the PUF MRAM bit cells to maintain an initial unpredictable memory state, but the PUF output will be reproduced for subsequent PUF read operations to the same PUF MRAM bit cells in the MRAM PUF array for reproducibility. The OTP of the PUF MRAM bit cells to permanently program their memory state to their initial PUF output can be accomplished by applying a breakdown voltage to the PUF MRAM bit cells during their programming such that their respective MTJs are stressed and their respective tunnel barriers electrically breakdown and become short circuits. In this manner, the programmed state in the PUF MRAM bit cells is based on the process variations therein to maintain its initial unpredictable state, but such programming is made permanent.

In additional aspects disclosed herein, the MRAM PUF array can be integrated into an MRAM array that also contains an MRAM data memory for data operations. For example, certain MRAM bit cells in the MRAM array (e.g., one or more memory rows of MRAM bit cells) can be designated as PUF MRAM bit cells to form the MRAM PUF array in the MRAM array. For example, a programmer may configure certain MRAM bit cells in the MRAM array to be PUF MRAM bit cells for an MRAM PUF array. Thus, the MRAM PUF array can include one or more memory rows of both data MRAM bit cells and reference MRAM bit cells. The PUF MRAM bit cells in the MRAM PUF array can each be initially programmed to the same memory state (e.g., logic '0' or '1' memory state) in a configuration mode. Then, in response to a PUF read operation in the MRAM PUF array, the PUF MRAM bit cells and reference MRAM bit cells in the selected memory row in the MRAM PUF array activated by the PUF read operation are accessed. The resistance sensed from the PUF MRAM bit cells is compared to the reference resistance between the reference MRAM bit cells in the accessed memory row. The difference in sensed resistance between the PUF MRAM bit cells and the reference resistance of the PUF MRAM reference cells is used to generate a PUF output. This difference in resistances between the PUF MRAM bit cells and the reference MRAM bit cells will be unpredictable in nature since the PUF MRAM bit cells and the reference MRAM bit cells are all initially programmed to the same memory state. Thereafter, the PUF output can be used to OTP the PUF MRAM bit cells in the accessed memory row in the MRAM PUF array so that subsequent PUF read operations to the same PUF MRAM bit cells generate the same PUF output. Further, by integrating the MRAM PUF array into an MRAM array that also contains an MRAM data array, access circuitry, such as sense amplifiers, write drivers, and decoders, for example, can be shared to control access to the MRAM array for both memory read and PUF read operations, thus saving memory area as opposed to providing a PUF memory having its own dedicated access circuitry separate from a data memory.

Figure 4:
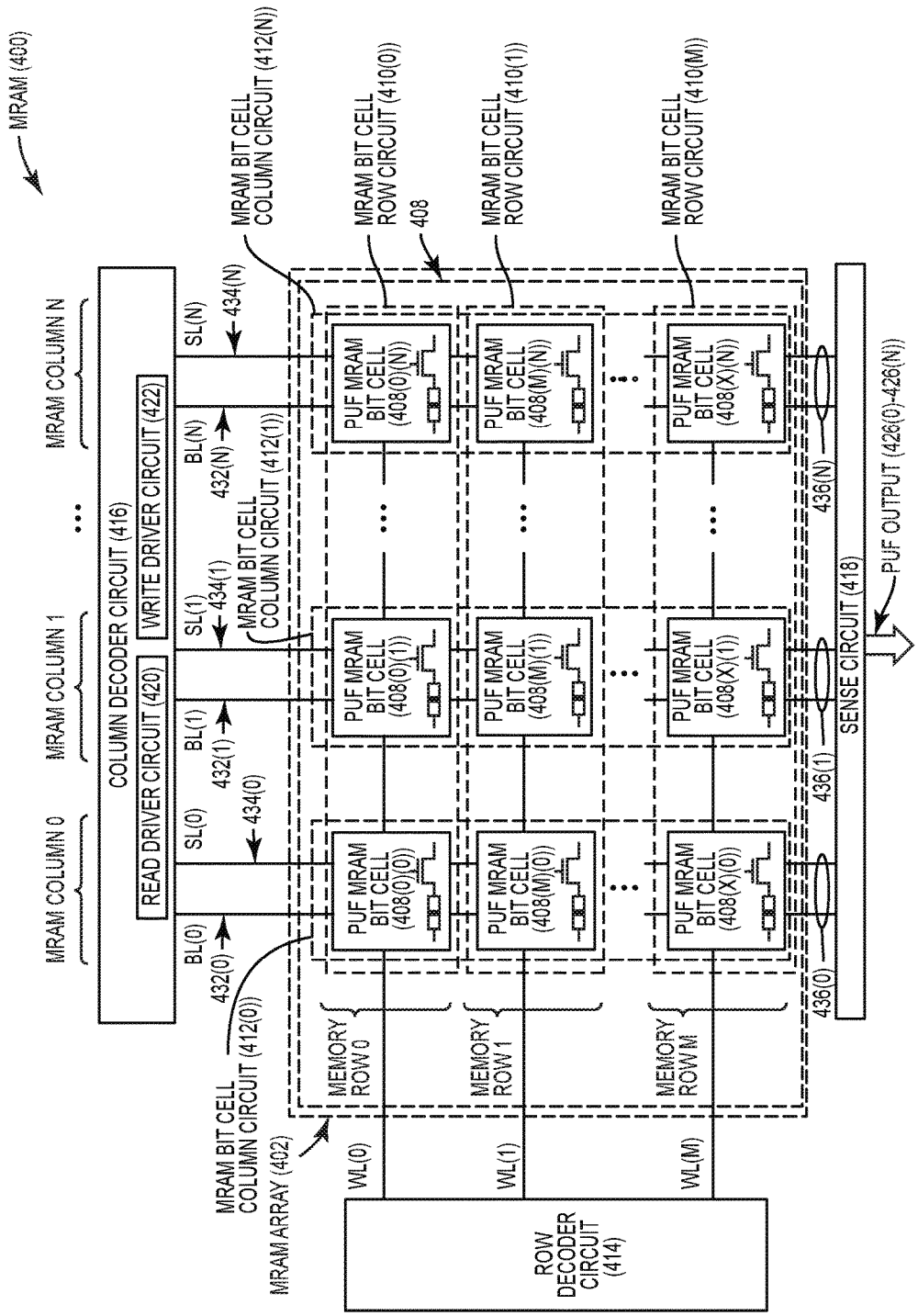
FIG. 4 is a schematic diagram of an exemplary PUF memory system that includes an MRAM PUF array that includes PUF MRAM bit cells for supporting PUF operations, wherein the PUF memory system further supports one-time programming (OTP) of the PUF MRAM bit cells in breakdown to a memory state from their previous read operation.

Before discussing exemplary details on the one-time programming (OTP) of magneto-resistive random access memory (MRAM) bit cells in a physically unclonable function (PUF) memory in breakdown to a memory state from their previous read operation to provide PUF operations, exemplary details of a memory system that includes an MRAM with an MRAM PUF array to control access to PUF MRAM bit cells for performing PUF operations is first discussed with regard to FIG. 4.

In this regard, FIG. 4 is a block diagram of an exemplary MRAM 400 that includes an MRAM array 402 that supports PUF operations. The MRAM 400 may be provided on a separate IC chip from a processor or integrated into the same IC chip as a processor. In this example, the entire MRAM array 402 consists of an MRAM PUF array 406 for supporting PUF operations. The MRAM PUF array 406 includes a plurality of PUF MRAM bit cells 408(0)(0)-408(M)(N) organized into 'M+1' memory rows 0-M and 'N+1' memory columns 0-N. Each PUF MRAM bit cell 408(0)(0)-408(M)(N) is configured to store a memory state. For example, the PUF MRAM bit cells 408(0)(0)-408(M)(N) may include an MTJ that is configured to store a memory state as a function of a magnetic orientation of a free magnetization layer. The MRAM PUF array 406 includes a plurality of MRAM bit cell row circuits 410(0)-410(M) each provided in a respective memory row 0-M. Each MRAM bit cell row circuit 410(0)-410(M) includes a plurality of PUF MRAM bit cells 408( )(0)-408( )(N) each provided in a respective memory column 0-N for generating a PUF output. The PUF MRAM bit cells 408(0)(0)-408(M)(N) are organized in their respective memory columns 0-N to form respective MRAM bit cell column circuits 412(0)-412(N).

With continuing reference to FIG. 4, the MRAM 400 includes a row decoder circuit 414, a column decoder circuit 416, and a sense circuit 418. The row decoder circuit 414 is coupled to the MRAM PUF array 406 via wordlines WL(0)-WL(M). Wordlines WL(0)-WL(M) are coupled to the PUF MRAM bit cells 408(0)(0)-408(M)(N) in the respective MRAM bit cell row circuits 410(0)-410(M). The row decoder circuit 414 is configured to assert one or more word lines WL(0)-WL(M) in response to a particular address received by the MRAM 400 to initiate a PUF access (e.g., read) operation to the MRAM PUF array 406. The column decoder circuit 416 is coupled to the MRAM PUF array 406 via bit lines BL(0)-BL(N) and source lines SL(0)-SL(N). The column decoder circuit 416 may include one or more read driver circuits 420 coupled to the MRAM bit cell column circuits 412(0)-412(N) to generate a read voltage on the bit lines BL(0)-BL(N) and/or the source lines SL(0)-SL(N) to read data from a PUF MRAM bit cell 408(0)(0)-408(M)(N) in a respective MRAM bit cell column circuit 412(0)-412(N). The column decoder circuit 416 may also include one or more write driver circuits 422 coupled to the MRAM bit cell column circuits 412(0)-412(N) to generate a write voltage on the bit lines BL(0)-BL(N) and/or the source lines SL(0)-SL(N) to write data from a PUF MRAM bit cell 408(0)(0)-408(M)(N) in a respective MRAM bit cell column circuit 412(0)-412(N).

With continuing reference to FIG. 4, the sense circuit 418 may be coupled to the MRAM PUF array 406 via the bit lines BL(0)-BL(N) and the source lines SL(0)-SL(N). The sense circuit 418 may be configured to generate a PUF output 426(0)-426(N) of 'N+1' bits based on voltages of the bit lines BL(0)-BL(N) and the source lines SL(0)-SL(N) in response to a PUF read operation. The voltages of the bit lines BL(0)-BL(N) and the source lines SL(0)-SL(N) during a read phase are indicative of the memory state of the PUF MRAM bit cells 408(0)(0)-408(M)(N) coupled to the bit lines BL(0)-BL(N) and the source lines SL(0)-SL(N). For example, in response to a PUF operation, the read driver circuit 420 asserts and de-asserts control signals to cause the PUF MRAM bit cells 408(0)(0)-408(M)(N) in the selected MRAM bit cell row circuit 410(0)-410(M) according to the activated word line WL(0)-WL(M) generated by the row decoder circuit 414 to generate and store PUF content in a read phase to generate the PUF output 426(0)-426(N). To illustrate, the sense circuit 418 may output the PUF output 426(0)-426(N) (e.g., a "response") in response to a particular memory address (e.g., a "challenge"). The row decoder circuit 414 and the column decoder circuit 416 may receive a memory address that is indicative of one or more of the MRAM PUF array 406. The sense circuit 418 may generate the PUF output 426(0)-426(N) based on the voltages of the bit lines BL(0)-BL(N) and/or the source lines SL(0)-SL(N). In this manner, the MRAM PUF array 406 may output different PUF outputs 426(0)-426(N) (e.g., different "responses") based on different addresses (e.g., different "challenges").

As will also be discussed in more detail below, one or more of the MRAM bit cell column circuits 412(0)-412(N) may be dedicated to provided reference MRAM bit cells 408( )(0)-408( )(N) whose sensed memory state (e.g., as a function of voltage or resistance) can be compared to a sensed memory state of other PUF MRAM bit cells 408(0)(0)-408(M)(N) in the same selected memory row 0-M. In this manner, the comparison of the sensed memory state between the reference MRAM bit cells 408( )(0)-408( )(N) and other accessed PUF MRAM bit cells 408( )(0)-408( )(N) in the same memory row 0-M has the effect of cancelling or mitigating process variation in the PUF MRAM bit cells 408(0)(0)-408(M)(N). This is because the PUF MRAM bit cells 408(0)(0)-408(M)(N) and the reference MRAM bit cell(s) 408( )(0)-408( )(N) are fabricated in the same semiconductor die in this example and thus both experience the same or similar process variations that skew their memory state characteristic (e.g., resistance). Otherwise, memory state characteristics in the PUF MRAM bit cells 408(0)(0)-408(M)(N) may be skewed due to process variation, which will then result in the PUF output 426(0)-426(N) being skewed to a particular memory state and thus not random.

A product identifier (or an identification or authorization process using PUF challenges and responses), a cryptographic key, or both may include (or be generated based on) the PUF output 426(0)-426(N). Because the PUF output 426(0)-426(N) is based on process-dependent variations at components (e.g., MTJ devices and transistors) of the PUF MRAM bit cells 408(0)(0)-408(M)(N) in the MRAM PUF array 406, the device identifier or the cryptographic key may be difficult or impossible to generate at another device. For example, another device including an MRAM array of similarly configured PUF MRAM bit cells 408(0)(0)-408(M)(N) in the MRAM PUF array 406 will likely generate a different PUF output 426(0)-426(N) in response to a particular challenge due to device-specific differences in transistor strengths and process-dependent characteristics of the PUF MRAM bit cells 408(0)(0)-408(M)(N) (e.g., resistance). Thus, another MRAM with the same configuration as the MRAM PUF array 406 in the MRAM 400 in FIG. 4 may generate a different PUF output 426(0)-426(N), and therefore a different device identifier (or cryptographic key). Thus, the MRAM 400 in FIG. 4 may enable generation of multiple different PUF outputs 426(0)-426(N) based on different "challenges." Because each PUF output 426(0)-426(N) is based on differences in transistor strengths and process-dependent characteristics of the PUF MRAM bit cells 408(0)(0)-408(M)(N), each PUF output 426(0)-426(N) is difficult (or impossible) to replicate using a different device. In this manner, the MRAM 400 provides robust and unique PUF outputs 426(0)-426(N) that are not degraded due to process variations of components outside of the PUF MRAM bit cells 408(0)(0)-408(M)(N), such as in the wordlines WL(0)-WL(M), the bit lines BL(0)-BL(N), the source lines SL(0)-SL(N), sense circuits, etc.

In the example MRAM 400 in FIG. 4, the PUF MRAM bit cells 408(0)(0)-408(M)(N) each include MTJs 428(0)(0)-428(M)(N) coupled to a respective bit line BL(0)-BL(N). The PUF MRAM bit cells 408(0)(0)-408(M)(N) also each include an access transistor 430(0)(0)-430(M)(N) coupled to a respective source line SL(0)-SL(N) and the MTJ 428(0)(0)-428(M)(N). A gate G of each access transistor 430(0)(0)-430(M)(N) is coupled to a respective word line WL(0)-WL(M), WL(X)-WL(Y) to control activation of the access transistor 430(0)(0)-430(M)(N) to in turn allow current to flow through the MTJs 428(0)(0)-428(M)(N) between the respective bit line BL(0)-BL(N) and source line SL(0)-SL(N) for read and write operations, depending on the MRAM bit cell row circuit 410(0)-410(M) selected by the respective wordline WL(0)-WL(M).

As discussed above, the MRAM PUF array 406 in the MRAM 400 in FIG. 4 supports PUF operations. As will be discussed in more detail below, in certain aspects, to support a PUF operation, the MRAM 400 includes a memory access circuit that is configured to one-time program (OTP) (i.e., write) a memory state to all or a subset of the PUF MRAM bit cells 408(0)(0)-408(M)(N) that will be accessed for a PUF read operation in breakdown to the memory state from a previous PUF read operation. In this regard, as discussed in more detail below, an initial PUF read operation to PUF MRAM bit cells 408(0)(0)-408(M)(N) in the MRAM PUF array 406 will generate a random PUF output 426(0)-426(N) based on the process variation and other skew factors of the PUF MRAM bit cells 408(0)(0)-408(M)(N). This PUF output 426(0)-426(N) may not be reproducible because of the random nature of the PUF output 426(0)-426(N). In this regard, in aspects disclosed herein, the initial randomly generated PUF output 426(0)-426(N) from PUF MRAM bit cells 408(0)(0)-408(M)(N) accessed in response to an initial PUF read operation to the MRAM PUF array 406 is subsequently used to permanently one-time programmed (OTP) the same accessed PUF MRAM bit cells 408(0)(0)-408(M)(N) into the same random memory state previously read. In this manner, the initial PUF output 426(0)-426(N) read from accessed PUF MRAM bit cells 408(0)(0)-408(M)(N) is randomly generated due to the process variations of the PUF MRAM bit cells 408(0)(0)-408(M)(N) to maintain an initial unpredictable memory state. However, after this random memory state is generated and then one-time programmed (OTP) into the same respective PUF MRAM bit cells 408(0)(0)-408(M)(N), the PUF output 426(0)-426(N) from the same PUF MRAM bit cells 408(0)(0)-408(M)(N) in subsequent PUF read operations will be reproduced as the same memory state for repeatability.

In this regard, an exemplary process 500 of one-time programming (OTP) to addressed PUF MRAM bit cells 408(0)(0)-408(M)(N) in breakdown in a PUF write operation to the memory state from a previous PUF read operation will now be discussed in reference to FIG. 5. The exemplary process 500 in FIG. 5 will be discussed in conjunction with FIG. 4. In this example, before performing a PUF read operation to read a memory state in an accessed PUF MRAM bit cells 408(0)(0)-408(M)(N) in a selected MRAM bit cell row circuit 410(0)-410(M), an optional step is performed of writing the same memory state to the PUF MRAM bit cells 408(0)(0)-408(M)(N) (e.g., a high or logic '1' memory state) so that the PUF MRAM bit cells 408(0)(0)-408(M)(N) are initially skewed in the same manner. In this regard, in response to an initial PUF write operation (block 502), program write signals 432(0)-432(N), 434(0)-434(N) are driven onto to respective bit lines BL(0)-BL(N) and source lines SL(0)-SL(N) by the write driver circuit 422 to program the at least one PUF MRAM bit cell 408(0)(0)-408(M)(N) in the MRAM bit cell column circuit 412(0)-412(N) to a reference memory state (block 504). For example, the program write signals 432(0)-432(N), 434(0)-434(N) drive a voltage differential between the bit lines BL(0)-BL(N) and source lines SL(0)-SL(N) to create a write current sufficient to switch the magnetic orientation of the free layer in the MTJs 428(0)(0)-428(M)(N) of the PUF MRAM bit cell 408(0)(0)-408(M)(N) in the accessed MRAM bit cell row circuit 410(0)-410(M) of the MRAM PUF array 406. The initial PUF write operation is performed to setup all the accessed PUF MRAM bit cells 408(0)(0)-408(M)(N) in the same memory state to achieve a random PUF read operation in a next step.

Figure 5:
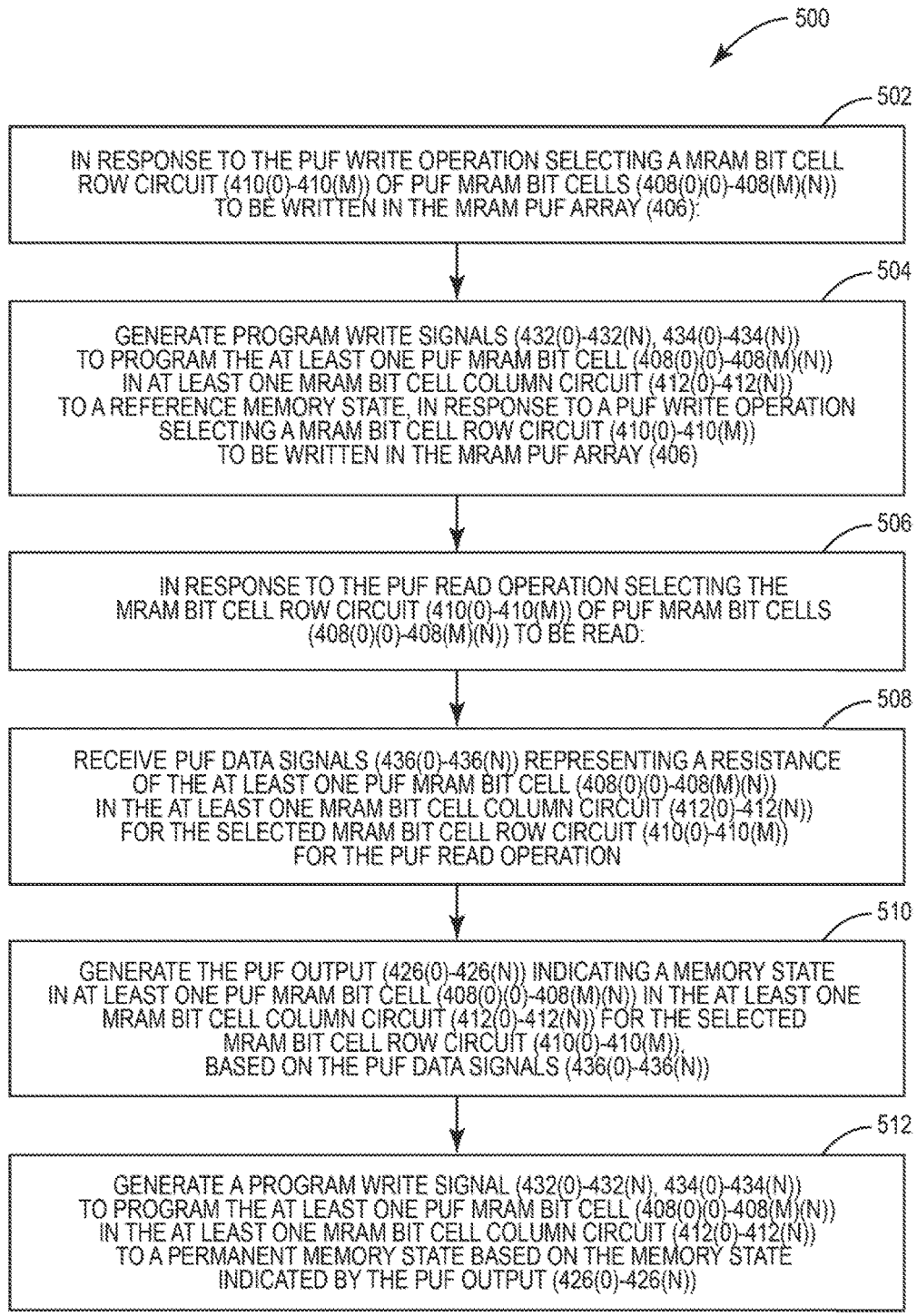
FIG. 5 is a flowchart illustrating an exemplary process of performing a PUF read operation of PUF MRAM data bit cells in the MRAM PUF array of the memory system in FIG. 5 and subsequently one-time programming (OTP) the PUF MRAM bit cells in breakdown to their memory state resulting from the PUF read operation to permanently store such memory state to the PUF MRAM data bit cells for subsequent PUF operations.

With continued reference to FIG. 5, a PUF read operation is next performed to read a memory state of the PUF MRAM bit cells 408(0)(0)-408(M)(N) in the selected MRAM bit cell row circuit 410(0)-410(M) of the MRAM PUF array 406 (block 506). In this regard, PUF data signals 436(0)-436(N) are received in the sense circuit 418 based on the memory state stored in the read PUF MRAM bit cell 408(0)(0)-408(M)(N) (block 508). For example, the PUF data signals 436(0)-436(N) may be voltage signals whose amplitude is a function of the resistances of the read PUF MRAM bit cells 408(0)(0)-408(M)(N). The sense circuit 418 is configured to generate the PUF outputs 426(0)-426(N) indicating a memory state in the read PUF MRAM bit cells 408(0)(0)-408(M)(N) in the MRAM bit cell column circuits 412(0)-412(N) for the selected MRAM bit cell row circuit 410(0)-410(M) based on the PUF data signals 436(0)-436(N) (block 510). Thereafter, the write driver circuit 422 is configured to generate the program write signals 432(0)-432(N), 434(0)-434(N) to program the PUF MRAM bit cells 408(0)(0)-408(M)(N) in the MRAM bit cell column circuits 412(0)-412(N) for the selected MRAM bit cell row circuit 410(0)-410(M) to a permanent memory state based on the memory state indicated by the PUF output 426(0)-426(N) (block 512). In this manner, when a subsequent PUF read operation to the MRAM bit cells 408(0)(0)-408(M)(N) in the MRAM bit cell column circuits 412(0)-412(N) for the selected MRAM bit cell row circuit 410(0)-410(M) is performed, the read memory states of such MRAM bit cells 408(0)(0)-408(M)(N) will be the initial random memory states read in the initial PUF operation. Subsequent PUF read operations to the PUF MRAM bit cells 408(0)(0)-408(M)(N) in the MRAM bit cell column circuits 412(0)-412(N) for the selected MRAM bit cell row circuit 410(0)-410(M) will yield the same memory state in a repeatable manner.

As an example, the one-time programming (OTP) of PUF MRAM bit cells 408(0)(0)-408(M)(N) to permanently program their memory state to their initial PUF output 426(0)-426(N) can be accomplished by applying a breakdown voltage between the respective bit line BL(0)-BL(N) and source line SL(0)-SL(N) of the programmed PUF MRAM bit cells 408(0)(0)-408(M)(N) during their programming, such that their respective MTJs 428(0)(0)-428(M)(N) are stressed and their respective tunnel barriers electrically breakdown and become short circuits. In this manner, the programmed state in the PUF MRAM bit cells 408(0)(0)-408(M)(N) is based on the process variations therein to maintain its initial unpredictable state, but such programming is made permanent. Breakdown voltage is the voltage at which a dielectric layer used as the tunnel barrier for the MTJ 428(0)(0)-428(M)(N) is stressed, such that it electrically breaks down and becomes a short. A dielectric breakdown condition is irreversible. For example, the PUF MRAM bit cells 408(0)(0)-408(M)(N) may have a breakdown voltage of 1.6 Volts (V) for example, which is higher than a write voltage that would be used to write a memory state to the PUF MRAM bit cells 408(0)(0)-408(M)(N) without breakdown such that the PUF MRAM bit cells 408(0)(0)-408(M)(N) could be subsequently overwritten with a new memory state.

Figure 6:
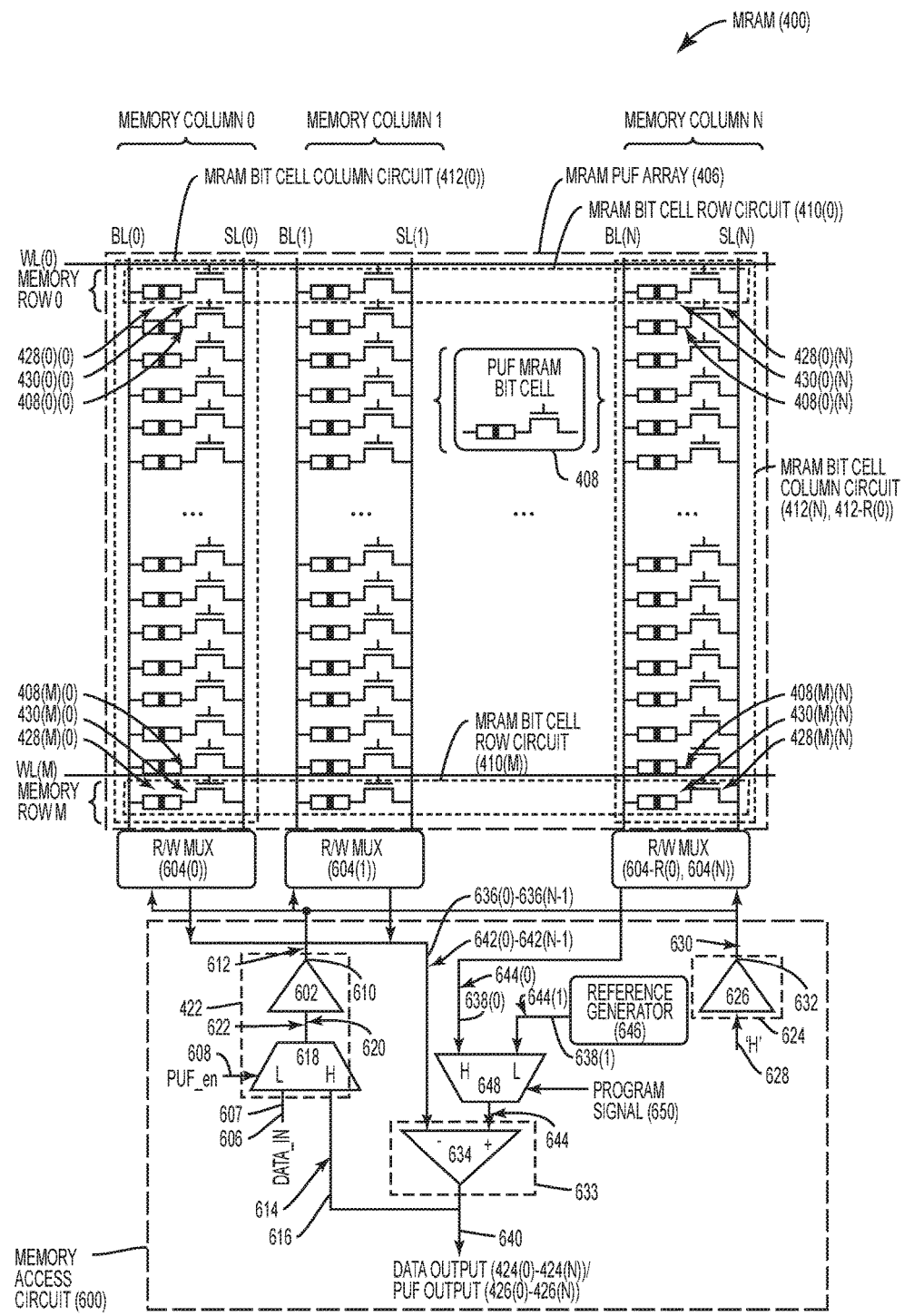
FIG. 6 is a schematic diagram of another exemplary PUF memory system that includes an MRAM PUF array that includes PUF MRAM bit cells for supporting PUF operations, wherein the PUF memory system further supports one-time programming (OTP) of the PUF MRAM bit cells in breakdown to a memory state from their previous read operation.

FIG. 6 is a schematic diagram of the MRAM 400 in FIG. 4 to explain more exemplary detail of the MRAM PUF array 406 supporting one-time programming (OTP) of the PUF MRAM bit cells 408(0)(0)-408(M)(N) in breakdown to a memory state from their previous read operation to provide PUF operations. Common elements between the MRAM 400 in FIG. 4 and the MRAM 400 in FIG. 6 are shown with common element numbers between FIGS. 4 and 6 and thus will not be re-described. To support PUF read and write operations to the MRAM PUF array 406, a memory access circuit 600 is provided. The memory access circuit 600 includes the write driver circuit 422. In this example, the write driver circuit 422 includes an amplifier 602 coupled to read/write selector circuits 604(0)-604(N) provided in each memory column 0-N that are coupled to the respective bit lines BL(0)-BL(N) and source lines SL(0)-SL(N). The read/write selector circuits 604(0)-604(N) are configured to selectively drive or pass the appropriate signal (e.g., voltage) onto respective bit lines BL(0)-BL(N) and source lines SL(0)-SL (N) to perform read and write operations in a respective MRAM bit cell column circuit 412(0)-412(N). The read/write selector circuits 604(0)-604(N) may be multiplexor circuits for selecting inputs to pass based on whether an operation is a read or write operation.

With continuing reference to FIG. 6, the write driver circuit 422 includes a write driver data input 606, a PUF enable input 608, and a write driver output 610. The write driver output 610 is coupled to the read/write selector circuits 604(0)-604(N) provided in each memory column 0-N that are coupled to respective bit lines BL(0)-BL(N) and source lines SL(0)-SL(N). The write driver circuit 422 is configured to generate a program write signal 612 on the write driver output 610 to write a memory state to the PUF MRAM bit cells 408(0)(0)-408(M)(N) for a data write operation or a PUF write operation. Data input signals DATA_IN can be asserted on a program selector data input 607 for a data write operation. A program write signal 614 coupled to the data output 424(0)-424(N) for a data read operation or the PUF output 426(0)-426(N) for a PUF read operation is coupled to a write driver data input 616 of the write driver circuit 422. In this example, the write driver circuit 422 includes a program selector circuit 618, which may be a multiplexor circuit. The program selector circuit 618 is configured to selectively pass a write signal 620 among the data input signals DATA_IN and the program write signal 614 in response to a PUF enable signal PUF_en on a program selector output 622. The PUF write enable signal PUF_en is asserted in a PUF write enable state on the PUF enable input 608 to cause the write driver circuit 422 to generate the program write signal 614 (e.g., a voltage) on the write driver output 610 to program the PUF MRAM bit cells 408(0)(0)-408(M)(N) in the selected MRAM bit cell row circuit 410(0)-410(M) based on the assertion of the respective wordline WL(X)-WL(M). As discussed above, to perform a PUF operation, in one example, all the PUF MRAM bit cells 408(0)(0)-408(M)(N) are first written to the same memory state by providing a data input signal DATA_IN on the write driver data input 606 to generate the program write signal 614 so that when a subsequent PUF read operation is performed, a random PUF output 426(0)-426(N) is achieved. Then, after a PUF read operation is performed to the PUF MRAM bit cells 408(0)(0)-408(M)(N) in the selected MRAM bit cell row circuit 410(0)-410(M) that causes the PUF output 426(0)-426(N) to be generated, the PUF output 426(0)-426(N) coupled to the write driver data input 616 is passed by the program selector circuit 618 in response to the PUF enable signal PUF_en indicating a PUF enable state, as the write signal 620 on the program selector output 622 to be one-time programmed (OTP) into the PUF MRAM bit cells 408(0)(0)-408(M)(N) in the selected MRAM bit cell row circuit 410(0)-410(M).

With continuing reference to FIG. 6, the memory access circuit 600 also includes a reference write driver circuit 624. In this example, the reference write driver circuit 624 includes an amplifier 626. The reference write driver circuit 624 includes a reference input 628 and a reference write driver output 632 coupled to at least one read/write selector circuit 604(0)-604(N) that is in a reference MRAM bit cell column circuit 412-R(0), which is an MRAM bit cell column circuit 412-R(0), 412(N) in this example. The reference write driver circuit 624 is configured to generate a reference write signal 630 on the reference write driver output 632 based on a signal indicating a high or logic '1' voltage level on the reference input 628. The generation of the reference write signal 630 by the reference write driver circuit 624 programs the reference MRAM bit cells 408(0)(R(0))-408(M)(R(0)) in the reference MRAM bit cell column circuit 412-R(0), 412(N) in the MRAM PUF array 406. In this example, MRAM bit cell column circuit 412-R(0) is designated as a reference MRAM bit cell column circuit wherein the PUF MRAM bit cells 408(0)(R(0))-408(M)(R(0)) are designated as reference MRAM bit cells.

With continuing reference to FIG. 6, the memory access circuit 600 also includes a data output circuit 633. In this example, the data output circuit 633 includes an amplifier 634. The data output circuit 633 includes MRAM bit cell column inputs 636(0)-636(N−1) coupled to the MRAM bit cell column circuits 412(0)-412(N−1) that are not the reference MRAM bit cell column circuits 412-R(0), 412(N) in this example. The data output circuit 633 also includes an MRAM bit cell column input 636(0) in this example that is coupled to respective reference MRAM bit cell column circuits 412-R(0), 412-R(N). The data output circuit 633 also includes a data output 640. In this regard, in response to a PUF read operation selecting an MRAM bit cell row circuit 410(0)-410(M) of PUF MRAM bit cells 408(0)(0)-408(M)(N−1) to be read, the data output circuit 633 is configured to receive a PUF output 426(0)-426(N−1) representing a resistance of the PUF MRAM bit cells 408(0)(0)-408(M)(N) in the MRAM bit cell column circuits 412(0)-412(N−1) for the selected MRAM bit cell row circuit 410(0)-410(M) in the MRAM PUF array 406 for the PUF read operation on the MRAM bit cell column inputs 636(0)-636(N−1). Also, in response to a PUF read operation selecting an MRAM bit cell row circuit 410(0)-410(M) of PUF MRAM bit cells 408(0)(0)-408(M)(N−1) to be read, the data output circuit 633 is configured to receive a first reference signal 644(0) representing either the resistance of the reference MRAM bit cells 408(0)(R(0))-408(M)(R(1)) in the MRAM bit cell column circuits 412-R(0), 412(N) or a reference generator signal 644(1) from a reference generator 646. A second program selector circuit 648 is provided that is configured to selectively pass either the first reference signal 644(0) or the reference generator signal 644(1) to the data output circuit 633 in response to a program signal 650. This allows the memory access circuit 600 to be configured to allow the data output circuit 633 to compare the PUF output 426(0)-426(N−1) to either a high reference memory state from the reference MRAM bit cells 408(0)(R(0))-408(M)(R(1)) in the MRAM bit cell column circuits 412-R(0), 412(N) or reference generator signal 644(1) from the reference generator 646. The data output circuit 633 is configured to compare the PUF data signals 542(0)-542(N) to the first reference signal 644(0) or reference generator signal 644(1). The data output circuit 633 is configured to generate the PUF output 426(0)-426(N) on the data output 640 based on the difference between the respective PUF data signals 542(0)-542(N) and the first reference signal 644(0) or reference generator signal 644(1). For example, the PUF data signals 542(0)-542(N), and the first reference signal 644(0) and reference generator signal 644(1) may be voltage signals that are indicative of the respective resistances of the PUF MRAM bit cells 408(0)(0)-408(M)(N−1) and the reference MRAM bit cell column input 636(0). Thus, a comparison of PUF output 426(0)-426(N) and the first reference signal 644(0) or the reference generator signal 644(1) representing a high or logic '1' memory state, or low or logic '0' memory state, will yield a random PUF output 426(0)-426(N) on the data output 640.

As discussed above, the data output 640 is coupled to the write driver data input 616 of the write driver circuit 422. Thus, after a PUF read operation is performed, the PUF outputs 426(0)-426(N) generated by the data output circuit

633 are provided to the write driver data input 616 to be used to program the PUF MRAM bit cells 408(0)(0)-408(M)(N−1) for the selected MRAM bit cell row circuit 410(0)-410(M) accessed in the PUF read operation to the same sensed memory state. In one example, as discussed above, the write driver circuit 422 is configured to generate a higher voltage signal as the program write signal 612 on the write driver output 610 that is equal to or in excess of the breakdown voltage of the MTJs 428(0)(0)-428(M)(N−1) of the PUF MRAM bit cells 408(0)(0)-408(M)(N−1) for the selected MRAM bit cell row circuit 410(0)-410(M) to one-time program (OTP) such PUF MRAM bit cells 408(0)(0)-408(M)(N−1) to the memory states of the PUF outputs 426(0)-426(N) from the PUF read operation. In this manner, in a subsequent PUF read operation to the PUF MRAM bit cells 408(0)(0)-408(M)(N−1), the initial random memory state of the PUF MRAM bit cells 408(0)(0)-408(M)(N−1) will be repeatedly reproduced since the PUF MRAM bit cells 408(0)(0)-408(M)(N−1) were forced to the memory state in the PUF write operation based on the PUF outputs 426(0)-426(N).

Figure 7:
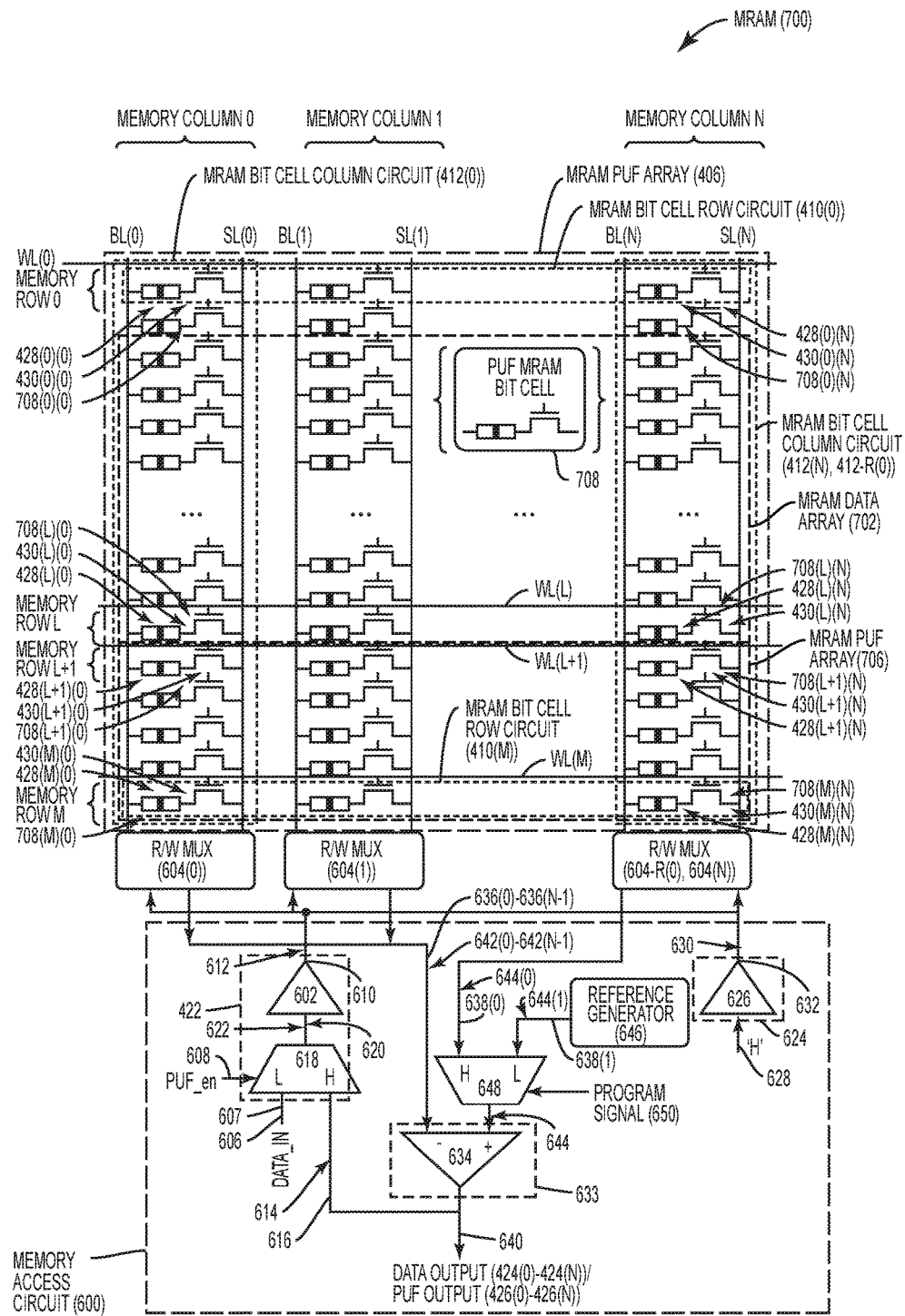
FIG. 7 is a schematic diagram of another exemplary PUF memory system that includes an MRAM array that includes a data MRAM array comprising data MRAM bit cells for supporting read/write memory operations in the memory system and an integrated MRAM PUF array that includes PUF MRAM bit cells for supporting PUF operations, wherein the PUF memory system further supports one-time programming (OTP) of the PUF MRAM bit cells in breakdown to a memory state from their previous read operation.

The MRAM 400 in FIG. 6 may be partitioned to include an MRAM data array to support read and write operations that are not PUF operations and the MRAM PUF array 406 to support PUF operations. In this regard, FIG. 7 is a schematic diagram of an MRAM 700 that is similar to the MRAM 400 in FIG. 6, but with the MRAM bit cells 408 partitioned. Common elements are shown between FIGS. 6 and 7 with common element numbers, and thus will not be re-described. In this regard, PUF MRAM bit cells 708(0)(0)-708(L)(N) are partitioned into an MRAM data array 702 for supporting read/write memory operations. PUF MRAM bit cells 708(L+1)(0)-708(M)(N) are partitioned in the MRAM data array 702 into the MRAM PUF array 406 for supporting PUF operations. The MRAM PUF array 406 supports one-time programming (OTP) of the PUF MRAM bit cells 708(X)(0)-708(Y)(N) in breakdown to a memory state from their previous read operations like described above. 'L' can represent any number of MRAM bit cell row circuits 410 desired to partition the desired number of MRAM bit cell row circuits 410 to be in the MRAM data array 702 and the MRAM PUF array 406. Thus, with the MRAM 700 in FIG. 7, a programmer or application can decide which MRAM bit cell row circuits 410(0)-410(M) are assigned to the MRAM data array 702 for data read and write operations, and which MRAM bit cell row circuits 410(L+1)-410(N) are assigned to the MRAM PUF array 406 for PUF operations. Thus, the programmer or application has flexibility in determining the relative size of the MRAM data array 702 and the MRAM PUF array 406 based on how the programmer or application will cause the MRAM bit cell row circuits 410(0)-410(N) to be accessed.

Memory data write and read operations can also be performed in the MRAM data array 702 that are not PUF operations. In this regard, as previously discussed above, the write driver circuit 422 in the MRAM 700 in FIG. 7 can be configured to generate the program write signal 612 to program a PUF MRAM bit cell 408(0)(0)-408(L)(N) in the MRAM bit cell column circuits 412(0)-412(L) to a memory state in response to a data write operation selecting an MRAM bit cell row circuit 410(0)-410(L) to be written in the MRAM data array 702. The reference write driver circuit 624 can also generate the reference write signal 630 to program a reference MRAM bit cell 408(0)(R(0))-408(L)(R(0)) in the reference MRAM bit cell column circuits 412-R(0) to logic '0' and '1' reference memory states, respectively, in response to the data write operation selecting the MRAM bit cell row circuit 410(0)-410(L+1) to be written in the MRAM data array 702. Then, for a data read operation selecting an MRAM bit cell row circuit 410(0)-410(L) to be read, the memory access circuit 600 is configured to receive PUF data signals 542(0)-542(N−1) representing a resistance of the read MRAM bit cells 408(0)(0)-408(L)(N) in the MRAM bit cell column circuits 412(0)-412(N) for the selected MRAM bit cell row circuit 410(0)-410(L) for the data read operation. The memory access circuit 600 is also configured to receive a first reference signal 644(0) and reference generator signal 644(1) representing a resistances of the reference MRAM bit cells 408(0)(R(0))-408(M)(R(1)) in the reference MRAM bit cell column circuit 412-R(0) for the selected MRAM bit cell row circuit 410(0)-410(M) for the data read operation. The memory access circuit 600 is configured to compare the PUF data signals 542(0)-542(N) to the first reference signal 644(0) or reference generator signal 644(1) passed by the second program selector circuit 648. Alternatively, the memory access circuit 600 may average the first reference signal 644(0) and reference generator signal 644(1). The memory access circuit 600 is then configured to generate the data output 424(0)-424(N) based on the difference between the data output 424(0)-424(N) and the first reference signal 644(0) and/or reference generator signal 644(1), or combination of same such as an average of the first reference signal 644(0) and the reference generator signal 644(1) for example.

Another aspect involves a memory access circuit for programming one or more PUF MRAM bit cells in an MRAM PUF array comprising at least one MRAM bit cell row circuit of PUF MRAM bit cells. In this regard, the memory access circuit comprises a means for generating a program write signal to program at least one PUF MRAM bit cell in at least one MRAM bit cell column circuit to a reference memory state, in response to a PUF write operation selecting an MRAM bit cell row circuit to be written in the MRAM PUF array. An example of the means for generating a program write signal to program at least one PUF MRAM bit cell in at least one MRAM bit cell column circuit to a reference memory state, in response to a PUF write operation selecting an MRAM bit cell row circuit to be written in the MRAM PUF array can include the memory access circuit 600, and more particularly, the write driver circuit 422 in FIGS. 4, 6, and 7. The memory access circuit also comprises, in response to a PUF read operation selecting the MRAM bit cell row circuit of the PUF MRAM bit cells to be read, a means for receiving a PUF data signal representing a resistance of the at least one PUF MRAM bit cell in the at least one MRAM bit cell column circuit for the selected MRAM bit cell row circuit for the PUF read operation, and a means for generating a PUF output based on the PUF data signal. The means for receiving a PUF data signal representing a resistance of the at least one PUF MRAM bit cell in the at least one MRAM bit cell column circuit for the selected MRAM bit cell row circuit for the PUF read operation, and the means for generating a PUF output based on the PUF data signal can each include the memory access circuit 600 in FIGS. 6 and 7. The memory access circuit also comprises a means for generating a program write signal to program the at least one PUF MRAM bit cell in the at least one MRAM bit cell column circuit to a permanent memory state based on a memory state indicated by the PUF output. The means for generating a program write signal to program the at least one PUF MRAM bit cell in the at least one MRAM bit cell column circuit to a permanent memory state based on a memory state indicated by the PUF output can include the memory access circuit 600, and more particularly, the write driver circuit 422 in FIGS. 4, 6, and 7.

MRAMs that include an MRAM PUF array that includes PUF MRAM bit cells for supporting PUF operations, wherein a PUF memory system further supports one-time programming (OTP) of the PUF MRAM bit cells in breakdown to a memory state from their previous read operation may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
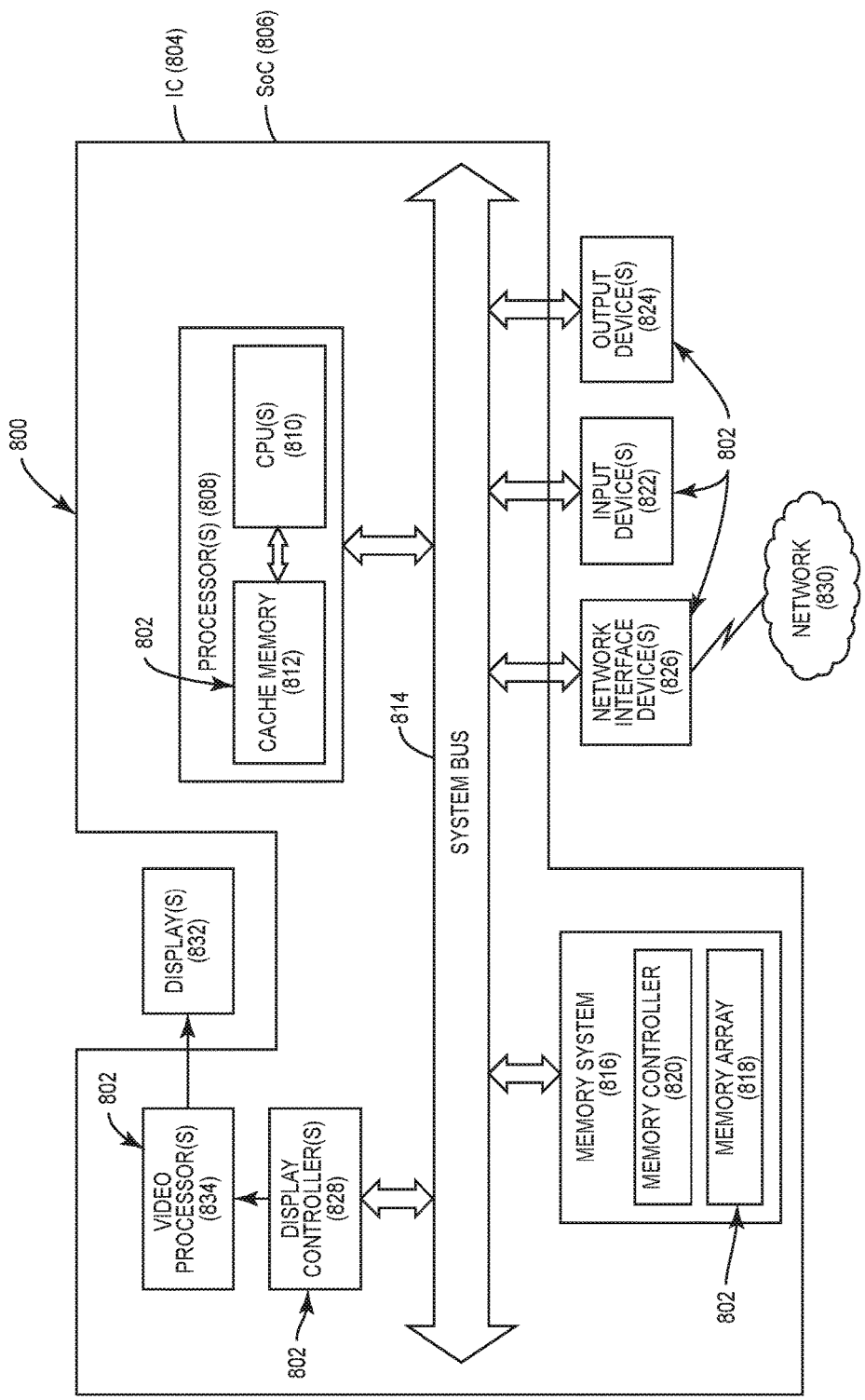
FIG. 8 is a block diagram of an exemplary processor-based system that includes one or more memory systems that include an MRAM array that can include an MRAM PUF array that includes PUF MRAM bit cells for supporting PUF operations, wherein the PUF memory system further supports one-time programming (OTP) of the PUF MRAM bit cells in breakdown to a memory state from their previous read operation, including but not limited to the MRAM and/or MRAM array in FIGS. 4, 6, and 7.

In this regard, FIG. 8 illustrates an example of a processor-based system 800 that can include one or more MRAMs that includes an MRAM PUF array that includes PUF MRAM bit cells for supporting PUF operations, wherein a PUF memory system 802 further supports one-time programming (OTP) of the PUF MRAM bit cells in breakdown to a memory state from their previous read operation. These PUF memory systems can include the MRAM 400, and/or MRAM PUF array 406 in FIGS. 4 and 6, and MRAM 700 and/or MRAM PUF array 406 in FIG. 7, as non-limiting examples.

In this example, the processor-based system 800 is provided in an IC 804. The IC 804 may be included in or provided as a system-on-a-chip (SoC) 806. The processor-based system 800 includes a processor 808 that includes one or more CPUs 810. The processor 808 may include a cache memory 812 coupled to the CPU(s) 810 for rapid access to temporarily stored data. The cache memory 812 may include MRAM PUF array that include one or more MRAMs that includes an MRAM PUF array that includes PUF MRAM bit cells for supporting PUF operations, wherein the PUF memory system further supports one-time programming (OTP) of the PUF MRAM bit cells in breakdown to a memory state from their previous read operation can include the MRAM 400, and/or MRAM PUF array 406 in FIGS. 4 and 6, and MRAM 700 and/or MRAM PUF array 406 in FIG. 7, as non-limiting examples. The processor 808 is coupled to a system bus 814 and can intercouple master and slave devices included in the processor-based system 800. As is well known, the processor 808 communicates with these other devices by exchanging address, control, and data information over the system bus 814. Although not illustrated in FIG. 8, multiple system buses 814 could be provided, wherein each system bus 814 constitutes a different fabric. For example, the processor 808 can communicate bus transaction requests to a memory system 816 as an example of a slave device. The memory system 816 may include a memory array 818 whose access is controlled by a memory controller 820. The memory system 1218 may be a one or more MRAMs that includes an MRAM PUF array that includes PUF MRAM bit cells for supporting PUF operations, wherein the PUF memory system further supports one-time programming (OTP) of the PUF MRAM bit cells in breakdown to a memory state from their previous read operation that can include the MRAM 400, and/or MRAM PUF array 406 in FIGS. 4 and 6, and MRAM 700 and/or MRAM PUF array 406 in FIG. 7, as non-limiting examples.

Other master and slave devices can be connected to the system bus 814. As illustrated in FIG. 8, these devices can include the memory system 816, and one or more input devices 822, which can include one or more MRAMs that includes an MRAM PUF array that includes PUF MRAM bit cells for supporting PUF operations, wherein the PUF memory system further supports one-time programming (OTP) of the PUF MRAM bit cells in breakdown to a memory state from their previous read operation can include the MRAM 400, and/or MRAM PUF array 406 in FIGS. 4 and 6, and MRAM 700 and/or MRAM PUF array 406 in FIG. 7, as non-limiting examples. The input device(s) 822 can include any type of input device, including but not limited to input keys, switches, voice processors, etc. The other devices can also include one or more output devices 824, and one or more network interface devices 826, both of which can one or more MRAMs that includes an MRAM PUF array that includes PUF MRAM bit cells for supporting PUF operations, wherein the PUF memory system further supports one-time programming (OTP) of the PUF MRAM bit cells in breakdown to a memory state from their previous read operation can include the MRAM 400, and/or MRAM PUF array 406 in FIGS. 4 and 6, and MRAM 700 and/or MRAM PUF array 406 in FIG. 7, as non-limiting examples. The output device(s) 824 can include any type of output device, including but not limited to audio, video, other visual indicators, etc. The other devices can also include one or more display controllers 828 as examples. The network interface device(s) 826 can be any devices configured to allow exchange of data to and from a network 830. The network 830 can be any type of network, including but not limited to a wired or wireless network, a private or public network, a local area network (LAN), a wireless local area network (WLAN), a wide area network (WAN), a BLUETOOTH™ network, and the Internet. The network interface device(s) 826 can be configured to support any type of communications protocol desired.

The processor 808 may also be configured to access the display controller(s) 828 over the system bus 814 to control information sent to one or more displays 832. The display controller(s) 828 sends information to the display(s) 832 to be displayed via one or more video processors 834, which process the information to be displayed into a format suitable for the display(s) 832. The display controller(s) 828 and the video processor(s) 834 can include one or more MRAMs that includes an MRAM PUF array that includes PUF MRAM bit cells for supporting PUF operations, wherein the PUF memory system further supports one-time programming (OTP) of the PUF MRAM bit cells in breakdown to a memory state from their previous read operation can include the MRAM 400, and/or MRAM PUF array 406 in FIGS. 4 and 6, and MRAM 700 and/or MRAM PUF array 406 in FIG. 7, as non-limiting examples. The display(s) 832 can include any type of display, including but not limited to a cathode ray tube (CRT), a liquid crystal display (LCD), a plasma display, etc.

Figure 9:
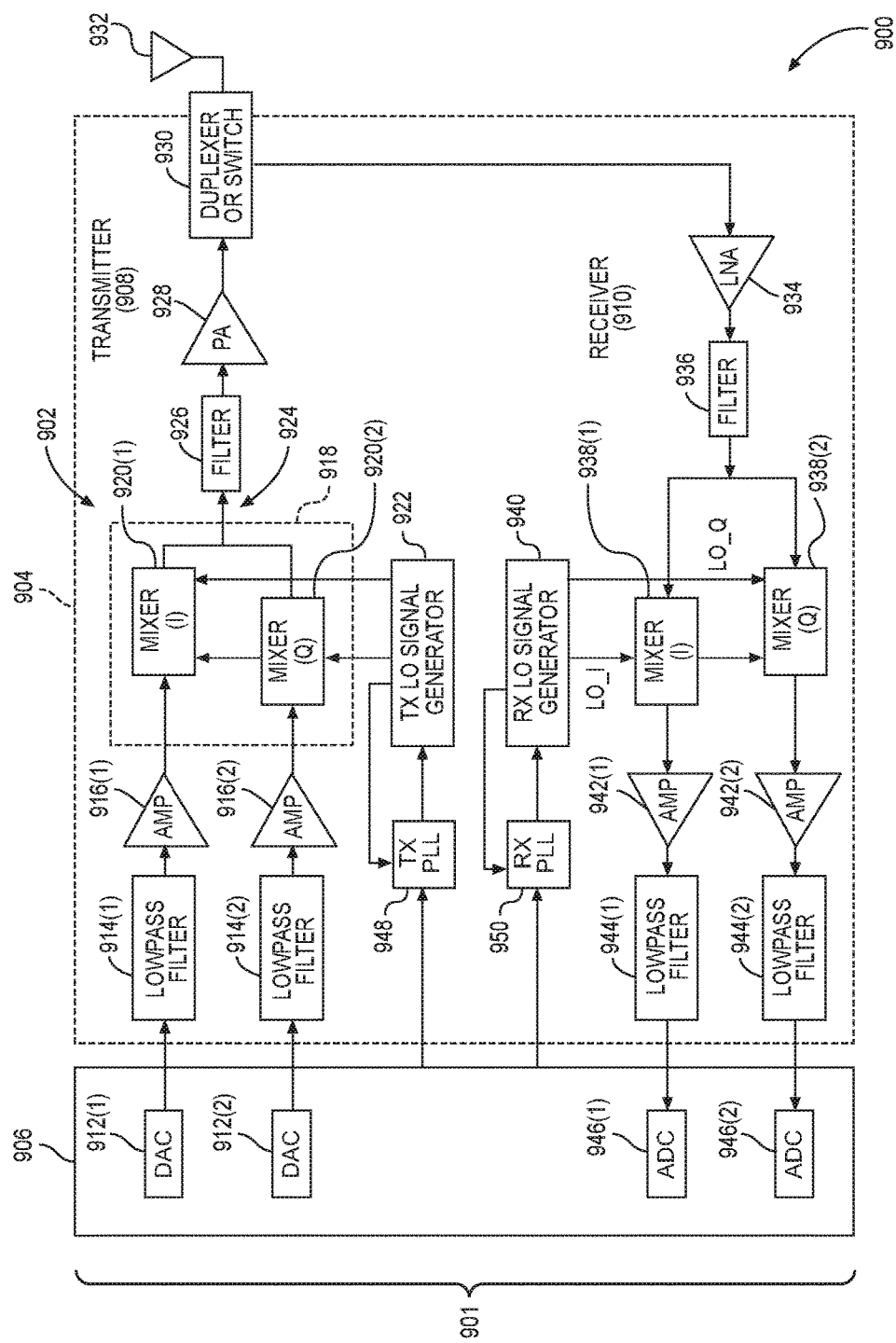
FIG. 9 is a block diagram of an exemplary wireless communications device that includes radio frequency (RF) components formed in an integrated circuit (IC), wherein any of the components therein can include an MRAM PUF array that includes PUF MRAM bit cells for supporting PUF operations, wherein the PUF memory system further supports one-time programming (OTP) of the PUF MRAM bit cells in breakdown to a memory state from their previous read operation, including but not limited to the MRAM and/or MRAM array in FIGS. 4, 6, and 7.

FIG. 9 illustrates an exemplary wireless communications device 900 that includes radio frequency (RF) components formed in an IC 902, wherein any of the components therein can be an MRAM array 901 that includes a data MRAM array comprising data MRAM bit cells for supporting read/write memory operations in the memory system, an integrated MRAM PUF array comprising PUF MRAM bit cells for supporting PUF operations, and common access circuitry that can be used to access the data MRAM bit cells for read/write memory operations and the PUF MRAM bit cells for PUF operations can include the MRAM 400, and/or MRAM PUF array 406 in FIGS. 4 and 6, and MRAM 700 and/or MRAM PUF array 406 in FIG. 7, as non-limiting examples. In this regard, the wireless communications device 900 may be provided in the IC 902. The wireless communications device 900 may include or be provided in any of the above referenced devices, as examples. As shown in FIG. 9, the wireless communications device 900 includes a transceiver 904 and a data processor 906. The data processor 906 may include a memory to store data and program codes. The transceiver 904 includes a transmitter 908 and a receiver 910 that support bi-directional communications. In general, the wireless communications device 900 may include any number of transmitters 908 and/or receivers 910 for any number of communication systems and frequency bands. All or a portion of the transceiver 904 may be implemented on one or more analog ICs, RF ICs (RFICs), mixed-signal ICs, etc.

The transmitter 908 or the receiver 910 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 910. In the direct-conversion architecture, a signal is frequency-converted between RF and baseband in one stage. The super-heterodyne and direct-conversion architectures may use different circuit blocks and/or have different requirements. In the wireless communications device 900 in FIG. 9, the transmitter 908 and the receiver 910 are implemented with the direct-conversion architecture.

In the transmit path, the data processor 906 processes data to be transmitted and provides I and Q analog output signals to the transmitter 908. In the exemplary wireless communications device 900, the data processor 906 includes digital-to-analog converters (DACs) 912(1), 912(2) for converting digital signals generated by the data processor 906 into the I and Q analog output signals, e.g., I and Q output currents, for further processing.

Within the transmitter 908, lowpass filters 914(1), 914(2) filter the I and Q analog output signals, respectively, to remove undesired signals caused by the prior digital-to-analog conversion. Amplifiers (AMP) 916(1), 916(2) amplify the signals from the lowpass filters 914(1), 914(2), respectively, and provide I and Q baseband signals. An upconverter 918 upconverts the I and Q baseband signals with I and Q transmit (TX) local oscillator (LO) signals through mixers 920(1), 920(2) from a TX LO signal generator 922 to provide an upconverted signal 924. A filter 926 filters the upconverted signal 924 to remove undesired signals caused by the frequency upconversion as well as noise in a receive frequency band. A power amplifier (PA) 928 amplifies the upconverted signal 924 from the filter 926 to obtain the desired output power level and provides a transmit RF signal. The transmit RF signal is routed through a duplexer or switch 930 and transmitted via an antenna 932.

In the receive path, the antenna 932 receives signals transmitted by base stations and provides a received RF signal, which is routed through the duplexer or switch 930 and provided to a low noise amplifier (LNA) 934. The duplexer or switch 930 is designed to operate with a specific receive (RX)-to-TX duplexer frequency separation, such that RX signals are isolated from TX signals. The received RF signal is amplified by the LNA 934 and filtered by a filter 936 to obtain a desired RF input signal. Downconversion mixers 938(1), 938(2) mix the output of the filter 936 with I and Q RX LO signals (i.e., LO_I and LO_Q) from an RX LO signal generator 940 to generate I and Q baseband signals. The I and Q baseband signals are amplified by amplifiers (AMP) 942(1), 942(2) and further filtered by lowpass filters 944(1), 944(2) to obtain I and Q analog input signals, which are provided to the data processor 906. In this example, the data processor 906 includes ADCs 946(1), 946(2) for converting the analog input signals into digital signals to be further processed by the data processor 906.

In the wireless communications device 900 of FIG. 9, the TX LO signal generator 922 generates the I and Q TX LO signals used for frequency upconversion, while the RX LO signal generator 940 generates the I and Q RX LO signals used for frequency downconversion. Each LO signal is a periodic signal with a particular fundamental frequency. A TX phase-locked loop (PLL) circuit 948 receives timing information from the data processor 906 and generates a control signal used to adjust the frequency and/or phase of the TX LO signals from the TX LO signal generator 922. Similarly, an RX PLL circuit 950 receives timing information from the data processor 906 and generates a control signal used to adjust the frequency and/or phase of the RX LO signals from the RX LO signal generator 940.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory access circuit for programming one or more physically unclonable function (PUF) magneto-resistive random access memory (MRAM) bit cells in an MRAM PUF array comprising at least one MRAM bit cell row circuit of PUF MRAM bit cells, the memory access circuit comprising:
   a data output circuit configured to, in response to a PUF read operation selecting an MRAM bit cell row circuit of PUF MRAM bit cells to be read:
      receive a PUF data signal representing a resistance of at least one PUF MRAM bit cell in the at least one MRAM bit cell column circuit for the selected MRAM bit cell row circuit for the PUF read operation; and
      generate a PUF output indicating a memory state in the at least one PUF MRAM bit cell in the at least one MRAM bit cell column circuit for the selected MRAM bit cell row circuit, based on the PUF data signal; and
   a write driver circuit coupled to the PUF output, the write driver circuit configured to, in response to the PUF read operation selecting the MRAM bit cell row circuit of the PUF MRAM bit cells to be read:
      generate a first program write signal to program the at least one PUF MRAM bit cell in the at least one MRAM bit cell column circuit to a permanent memory state based on the memory state indicated by the PUF output.

2. The memory access circuit of claim 1, wherein the write driver circuit is further configured to generate a second program write signal to program the at least one PUF MRAM bit cell in the at least one MRAM bit cell column circuit to a reference memory state, in response to a PUF write operation selecting an MRAM bit cell row circuit to be written in the MRAM PUF array.

3. The memory access circuit of claim 1, wherein the write driver circuit is configured to, in response to the PUF read operation selecting the MRAM bit cell row circuit of the PUF MRAM bit cells to be read, generate the first program write signal at or exceeding a breakdown voltage of the at least one PUF MRAM bit cell in the at least one MRAM bit cell column circuit to one-time program the at least one PUF MRAM bit cell in the at least one MRAM bit cell column circuit to the permanent memory state based on the memory state indicated by the PUF output.

4. The memory access circuit of claim 1, wherein the write driver circuit comprises a write driver data input and a write driver data output coupled to at least one MRAM bit cell column circuit in the MRAM PUF array;
   the write driver circuit configured to:
      generate the first program write signal on the write driver data output to program the at least one PUF MRAM bit cell in the at least one MRAM bit cell column circuit to the permanent memory state based on the memory state indicated by the PUF output.

5. The memory access circuit of claim 4, wherein the write driver circuit is configured to generate the first program write signal on the write driver data output to program the at least one PUF MRAM bit cell in the at least one MRAM bit cell column circuit to a reference memory state, in response to a PUF write operation selecting an MRAM bit cell row circuit to be written in the MRAM PUF array.

6. The memory access circuit of claim 2, further comprising a program selector circuit configured to selectively pass a write signal among a data input signal and the first or the second program write signal in response to a PUF enable signal.

7. The memory access circuit of claim 6, wherein the program selector circuit comprises a program selector data input, a read data input coupled to the PUF output, and a program selector output coupled to the write driver circuit.

8. The memory access circuit of claim 6, further comprising a second program selector circuit configured to selectively pass a data output signal among the PUF data signal and a reference generator signal to the data output circuit, in response to the PUF read operation selecting the MRAM bit cell row circuit of the PUF MRAM bit cells to be read.

9. The memory access circuit of claim 1, wherein the data output circuit comprises at least one MRAM bit cell column input coupled to the at least one MRAM bit cell column circuit, at least one reference MRAM bit cell column input, and a data output;
   wherein, in response to a PUF write operation selecting an MRAM bit cell row circuit of the PUF MRAM bit cells to be written in the MRAM PUF array, the data output circuit is configured to:
      receive the PUF data signal representing the resistance of the at least one PUF MRAM bit cell in the at least one MRAM bit cell column circuit for the selected MRAM bit cell row circuit for the PUF read operation on the at least one MRAM bit cell column input; and generate the PUF output on the data output indicating the memory state in the at least one PUF MRAM bit cell in the at least one MRAM bit cell column circuit for the selected MRAM bit cell row circuit, based on the PUF data signal.

10. The memory access circuit of claim 2, further comprising:

a reference write driver circuit configured to generate a second reference write signal to program at least one reference MRAM bit cell in at least one reference MRAM bit cell column circuit to the reference memory state, in response to the PUF write operation selecting the MRAM bit cell row circuit to be written in the MRAM PUF array; and the data output circuit further configured to, in response to the PUF read operation selecting the MRAM bit cell row circuit of the PUF MRAM bit cells to be read:
receive a reference signal representing a resistance of the at least one reference MRAM bit cell in the at least one reference MRAM bit cell column circuit for the selected MRAM bit cell row circuit for the PUF read operation;
compare the PUF data signal to the reference signal; and
generate the PUF output indicating the memory state in the at least one PUF MRAM bit cell in the at least one MRAM bit cell column circuit for the selected MRAM bit cell row circuit, based on a difference between the PUF data signal and the reference signal.

11. The memory access circuit of claim 10, wherein the reference write driver circuit comprises a reference input and a reference write driver output coupled to the at least one reference MRAM bit cell column circuit in the MRAM PUF array;

the reference write driver circuit configured to generate the second reference write signal to program the at least one reference MRAM bit cell in the at least one reference MRAM bit cell column circuit to the reference memory state, in response to the PUF write operation selecting the MRAM bit cell row circuit to be written in the MRAM PUF array.

12. The memory access circuit of claim 10, wherein the data output circuit comprises at least one MRAM bit cell column input coupled to the at least one MRAM bit cell column circuit, at least one reference MRAM bit cell column input, and a data output;

wherein, in response to the PUF write operation selecting the MRAM bit cell row circuit of the PUF MRAM bit cells to be written in the MRAM PUF array, the data output circuit is configured to:
receive the PUF data signal representing the resistance of the at least one PUF MRAM bit cell in the at least one MRAM bit cell column circuit for the selected MRAM bit cell row circuit for the PUF read operation on the at least one MRAM bit cell column input;
receive the reference signal representing the resistance of the at least one reference MRAM bit cell in the at least one reference MRAM bit cell column circuit for the selected MRAM bit cell row circuit for the PUF read operation on the at least one reference MRAM bit cell column input;
compare the PUF data signal to the reference signal; and generate the PUF output indicating the memory state in the at least one PUF MRAM bit cell in the at least one MRAM bit cell column circuit for the selected MRAM bit cell row circuit on the data output, based on the difference between the PUF data signal and the reference signal.

13. A memory access circuit for programming one or more physically unclonable function (PUF) magneto-resistive random access memory (MRAM) bit cells in an MRAM PUF array comprising at least one MRAM bit cell row circuit of PUF MRAM bit cells, the memory access circuit comprising:

a data output circuit comprising:
a means to receive a PUF data signal representing a resistance of at least one PUF MRAM bit cell in at least one MRAM bit cell column circuit for a selected MRAM bit cell row circuit for a PUF read operation; and
a means to generate a PUF output indicating a memory state in the at least one PUF MRAM bit cell in the at least one MRAM bit cell column circuit for the selected MRAM bit cell row circuit, based on the PUF data signal; and a write driver circuit coupled to the PUF output, the write driver circuit comprising:
a means to generate a first program write signal to program the at least one PUF MRAM bit cell in the at least one MRAM bit cell column circuit to a permanent memory state based on the memory state indicated by the PUF output.

14. A method of programming at least one physically unclonable function (PUF) magneto-resistive random access memory (MRAM) bit cell in an MRAM PUF array in an MRAM for performing a PUF operation, the MRAM PUF array comprising a plurality of MRAM bit cell row circuits each comprising a plurality of PUF MRAM bit cells, and a plurality of MRAM bit cell column circuits each comprising a PUF MRAM bit cell from an MRAM bit cell row circuit among the plurality of MRAM bit cell row circuits, the method comprising:

receiving a PUF data signal representing a resistance of at least one PUF MRAM bit cell in at least one MRAM bit cell column circuit for a selected MRAM bit cell row circuit for a PUF read operation;

generating a PUF output indicating a memory state in the at least one PUF MRAM bit cell in the at least one MRAM bit cell column circuit for the selected MRAM bit cell row circuit, based on the PUF data signal; and generating a first program write signal to program the at least one PUF MRAM bit cell in the at least one MRAM bit cell column circuit to a permanent memory state based on the memory state indicated by the PUF output.

15. The method of claim 14, further comprising generating a second program write signal to program the at least one PUF MRAM bit cell in the at least one MRAM bit cell column circuit to a reference memory state, in response to a PUF write operation selecting an MRAM bit cell row circuit to be written in the MRAM PUF array.

16. The method of claim 14, wherein, in response to the PUF read operation selecting the MRAM bit cell row circuit of PUF MRAM bit cells to be read, generating the first program write signal comprises generating the first program write signal at or exceeding a breakdown voltage of the at least one PUF MRAM bit cell in the at least one MRAM bit cell column circuit to one-time program the at least one PUF MRAM bit cell in the at least one MRAM bit cell column circuit to the permanent memory state based on the memory state indicated by the PUF output.

17. The method of claim 14, further comprising selectively passing a write signal among a data input signal and the first program write signal in response to a PUF enable signal.

18. The method of claim 17, further comprising selectively passing a data output signal among the PUF data signal and a reference generator signal to a data output circuit, in response to the PUF read operation selecting the MRAM bit cell row circuit of PUF MRAM bit cells to be read.

19. The method of claim 15, further comprising:
generating a second reference write signal to program at least one reference MRAM bit cell in at least one reference MRAM bit cell column circuit to the reference memory state, in response to the PUF write operation selecting the MRAM bit cell row circuit to be written in the MRAM PUF array;
receiving a reference signal representing a resistance of the at least one reference MRAM bit cell in the at least one reference MRAM bit cell column circuit to program the plurality of PUF MRAM bit cells in the at least one MRAM bit cell column circuit for the selected MRAM bit cell row circuit for the PUF read operation; and
comparing the PUF data signal to the reference signal;
wherein generating the PUF output comprises generating the PUF output indicating the memory state in the at least one PUF MRAM bit cell in the at least one MRAM bit cell column circuit for the selected MRAM bit cell row circuit, based on a difference between the PUF data signal and the reference signal.

20. The method of claim 14, further comprising:
in response to a data write operation selecting an MRAM bit cell row circuit to be written in an MRAM data array comprising one or more MRAM bit cell row circuits among the plurality of MRAM bit cell row circuits in the MRAM PUF array, wherein MRAM bit cells in the MRAM data array comprise a plurality of data MRAM bit cells:
generating a write signal to program a data MRAM bit cell in at least one MRAM bit cell column circuit to a memory state, in response to the data write operation selecting the MRAM bit cell row circuit to be written in the MRAM data array; and
in response to a data read operation selecting an MRAM bit cell row circuit to be read:
receiving a data signal representing a resistance of at least one data MRAM bit cell in the at least one MRAM bit cell column circuit for the selected MRAM bit cell row circuit for the data read operation; and
generating a data output indicating the memory state in the at least one PUF MRAM bit cell in the at least one MRAM bit cell column circuit for the selected MRAM bit cell row circuit, based on the data signal.

21. The method of claim 20, further comprising:
in response to the data write operation selecting the MRAM bit cell row circuit to be written in the MRAM data array:
generating a reference write signal to program at least one reference MRAM bit cell in at least one reference MRAM bit cell column circuit to a reference memory state; and
in response to the data read operation selecting the MRAM bit cell row circuit to be read:
receiving a data reference signal representing a resistance of the at least one reference MRAM bit cell in the at least one reference MRAM bit cell column circuit for the selected MRAM bit cell row circuit for the data read operation;
comparing the data signal to the data reference signal; and
generating the data output indicating the memory state in the at least one PUF MRAM bit cell in the at least one MRAM bit cell column circuit for the selected MRAM bit cell row circuit, based on a difference between the data signal and the data reference signal.

22. A magneto-resistive random access memory (MRAM), comprising:
an MRAM array, comprising:
a plurality of MRAM bit cell row circuits each comprising a plurality of MRAM bit cells; and
a plurality of MRAM bit cell column circuits each comprising an MRAM bit cell from an MRAM bit cell row circuit among the plurality of MRAM bit cell row circuits;
an MRAM physically unclonable function (PUF) array comprising one or more MRAM bit cell row circuits among the plurality of MRAM bit cell row circuits in the MRAM array not included in an MRAM data array, wherein MRAM bit cells in the MRAM PUF array comprise a plurality of PUF MRAM bit cells; and
a memory access circuit, comprising:
a data output circuit configured to, in response to a PUF read operation selecting an MRAM bit cell row circuit of PUF MRAM bit cells to be read:
receive a PUF data signal representing a resistance of at least one PUF MRAM bit cell in at least one MRAM bit cell column circuit for the selected MRAM bit cell row circuit for the PUF read operation; and
generate a PUF output indicating a memory state in the at least one PUF MRAM bit cell in the at least one MRAM bit cell column circuit for the selected MRAM bit cell row circuit, based on the PUF data signal; and
a write driver circuit coupled to the PUF output, the write driver circuit further configured to, in response to the PUF read operation selecting the MRAM bit cell row circuit of the PUF MRAM bit cells to be read:
generate a first program write signal to program the at least one PUF MRAM bit cell in the at least one MRAM bit cell column circuit to a permanent memory state based on the memory state indicated by the PUF output.

23. The MRAM of claim 22, wherein the write driver circuit is further configured to generate a second program write signal to program the at least one PUF MRAM bit cell in the at least one MRAM bit cell column circuit to a reference memory state, in response to a PUF write operation selecting an MRAM bit cell row circuit to be written in the MRAM PUF array.

24. The MRAM of claim 22, wherein the MRAM data array further comprises one or more MRAM bit cell row circuits among the plurality of MRAM bit cell row circuits in the MRAM array, wherein MRAM bit cells in the MRAM data array comprise a plurality of data MRAM bit cells.

25. The MRAM of claim 22, wherein:
the write driver circuit is further configured to generate a write signal to program a data MRAM bit cell in at least one MRAM bit cell column circuit to a memory state, in response to a data write operation selecting an MRAM bit cell row circuit to be written in the MRAM data array; and the data output circuit is further configured to, in response to a data read operation selecting an MRAM bit cell row circuit to be read:

receive a data signal representing a resistance of at least one data MRAM bit cell in the at least one MRAM bit cell column circuit for the selected MRAM bit cell row circuit for the data read operation; and generate a data output indicating the memory state in at least one PUF MRAM bit cell in the at least one MRAM bit cell column circuit for the selected MRAM bit cell row circuit, based on the data signal.

26. The MRAM of claim 23, further comprising:

a reference write driver circuit configured to generate a second reference write signal to program at least one reference MRAM bit cell in at least one reference MRAM bit cell column circuit to the reference memory state, in response to the PUF write operation selecting the MRAM bit cell row circuit to be written in the MRAM PUF array; and the data output circuit further configured to, in response to the PUF read operation selecting the MRAM bit cell row circuit of the PUF MRAM bit cells to be read:

receive a reference signal representing a resistance of the at least one reference MRAM bit cell in the at least one reference MRAM bit cell column circuit for the selected MRAM bit cell row circuit for the PUF read operation;

compare the PUF data signal to the reference signal; and generate the PUF output indicating the memory state in the at least one PUF MRAM bit cell in the at least one MRAM bit cell column circuit for the selected MRAM bit cell row circuit, based on a difference between the PUF data signal and the reference signal.

27. The MRAM of claim 22, further comprising a plurality of read/write selector circuits, each read/write selector circuit among the plurality of read/write selector circuits coupled to an MRAM bit cell column circuit among the plurality of MRAM bit cell column circuits;

the memory access circuit coupled to the plurality of read/write selector circuits; and wherein:

the write driver circuit is configured to:

generate a second program write signal to at least one read/write selector circuit among the plurality of read/write selector circuits coupled to the at least one MRAM bit cell column circuit to program the at least one PUF MRAM bit cell in the at least one MRAM bit cell column circuit to a reference memory state, in response to a PUF write operation selecting an MRAM bit cell row circuit to be written in the MRAM PUF array; and generate the first program write signal to the at least one read/write selector circuit among the plurality of read/write selector circuits coupled to the at least one MRAM bit cell column circuit to program the at least one PUF MRAM bit cell in the at least one MRAM bit cell column circuit to the permanent memory state based on the memory state indicated by the PUF output.

28. The MRAM of claim 22, wherein each PUF MRAM bit cell among the plurality of PUF MRAM bit cells comprises:

a magnetic tunnel junction (MTJ) coupled to a bit line; and an access transistor coupled to the MTJ, the access transistor comprising a gate coupled to a word line and a source coupled to a source line.

29. The MRAM of claim 22 integrated into an integrated circuit (IC).

30. The MRAM of claim 22 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *